(12) United States Patent
Souza

(10) Patent No.: US 8,395,624 B2
(45) Date of Patent: Mar. 12, 2013

(54) DYNAMIC GENERATION OF IMAGES TO FACILITATE INFORMATION VISUALIZATION

(75) Inventor: Steve Souza, Richmond (GB)

(73) Assignee: Steve Souza, Richmond Surrey (GB)

( * ) Notice: Subject to any disclaimer, the term of this patent is extended or adjusted under 35 U.S.C. 154(b) by 248 days.

(21) Appl. No.: 12/834,718

(22) Filed: Jul. 12, 2010

(65) Prior Publication Data
US 2011/0012917 A1    Jan. 20, 2011

Related U.S. Application Data

(60) Provisional application No. 61/225,375, filed on Jul. 14, 2009.

(51) Int. Cl.
G06T 11/20 (2006.01)
G06K 9/00 (2006.01)
(52) U.S. Cl. .......... 345/440; 345/593; 382/113
(58) Field of Classification Search .......... None
See application file for complete search history.

(56) References Cited

U.S. PATENT DOCUMENTS

| | | | | |
|---|---|---|---|---|
| 5,371,854 A * | 12/1994 | Kramer | | 704/270 |
| 5,995,113 A * | 11/1999 | Mitchell et al. | | 345/440 |
| 6,034,697 A * | 3/2000 | Becker | | 345/606 |
| 7,096,154 B1 * | 8/2006 | Andrade-Cetto | | 702/181 |
| 2004/0027350 A1 * | 2/2004 | Kincaid et al. | | 345/440 |
| 2006/0028471 A1 * | 2/2006 | Kincaid et al. | | 345/440 |
| 2006/0221077 A1 * | 10/2006 | Wright et al. | | 345/428 |
| 2008/0007554 A1 * | 1/2008 | Kobayashi et al. | | 345/440 |
| 2008/0077583 A1 | 3/2008 | Castro et al. | | |
| 2008/0091107 A1 * | 4/2008 | Kim | | 600/454 |
| 2008/0226178 A1 | 9/2008 | Penke et al. | | |
| 2010/0039433 A1 * | 2/2010 | McGreevy et al. | | 345/473 |
| 2010/0287178 A1 | 11/2010 | Lambert et al. | | |
| 2010/0332962 A1 | 12/2010 | Hammer et al. | | |

OTHER PUBLICATIONS

Wilkinson et al., "The History of the Cluster Heat Map," The American Statiscian, Nov. 18, 2008, pp. 1-11.

* cited by examiner

*Primary Examiner* — Hau Nguyen
*Assistant Examiner* — Ryan D McCulley
(74) *Attorney, Agent, or Firm* — Brokaw Patent Law P.C.; Christopher J. Brokaw

(57) ABSTRACT

Approaches for generating a digital image that facilitates data analysis. An application may arrange values of one or more data sets into a table based on a selected set of columns. The application may apply one or more formulas to each cell to generate a second table that has a single value in each cell. The application maps, for each cell of the second table, the value stored therein to an attribute (such as a color). The application may generate a digital image by determining a color for each pixel of the digital image based on how the cells are mapped to colors. The digital image enables data analysis, such as the identification of trends, patterns, and/or anomalies, on any number of data sets in an expeditious and intuitive manner. The digital image may be dynamically updated to reflect further analysis or incremental updates to the data sets.

20 Claims, 19 Drawing Sheets

180

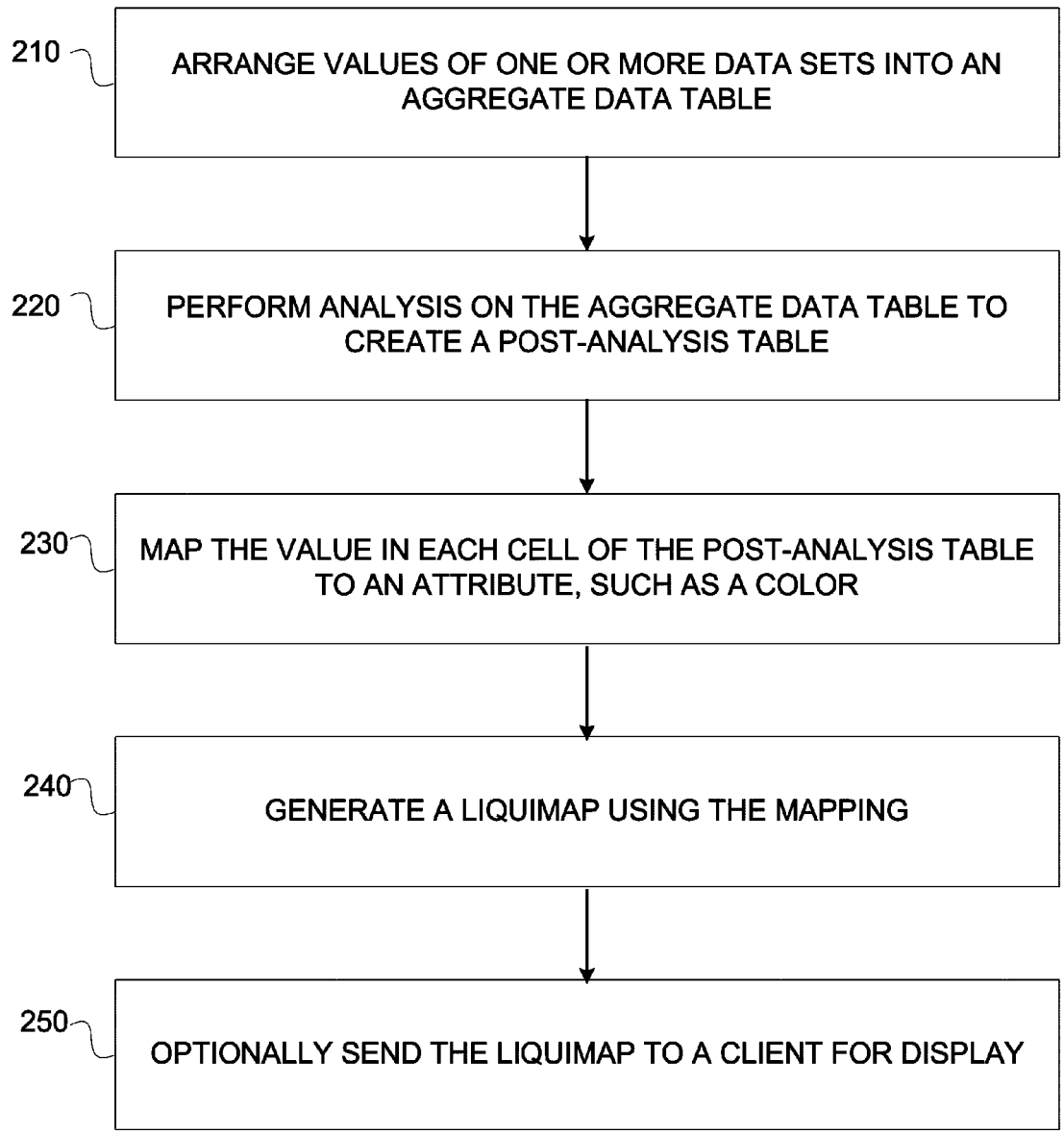

FIG. 3A

| Key Column 1 | Value Column 1 | Value Column 2 |
|---|---|---|
| A | 1 | 2 |
| A | 3 | 4 |
| B | 5 | 10 |
| B | 10 | 20 |

302 → Key Column 1; 304 → Value Column 1; 306 → Value Column 2; 300

FIG. 3B

| Key Column 1 | Value Column 1 | Value Column 2 | Row Total Aggregates |
|---|---|---|---|
| A | {1, 3} | {2, 4} | {1, 3, 2, 4} |
| B | {5, 10} | {10, 20} | {5, 10, 10, 20} |
| Column Total Aggregates | {1, 3, 5, 10} | {2, 4, 10, 20} | Full data set Aggregates {1, 2, 3, 4, 5, 10, 10, 20} |

312 → Key Column 1; 314 → Value Column 1; 322; 316 → Value Column 2; 326 → Row Total Aggregates; 318; 320; 324 → Column Total Aggregates; 310

FIG. 3C

| Key Column 1 | Value Column 1 | Value Column 2 | Row Total Aggregates |
|---|---|---|---|
| A | 1 | 1 | {1, 3, 2, 4} |
| B | 2 | 2 | {5, 10, 10, 20} |
| Column Total Aggregates | {1, 3, 5, 10} | {2, 4, 10, 20} | Full data set Aggregates {1, 2, 3, 4, 5, 10, 10, 20} |

| Key Column 1 | Value Column 1 | Value Column 2 | Row Total Aggregates |
|---|---|---|---|
| A | Green | Green | {1, 3, 2, 4} |
| B | Red | Red | {5, 10, 10, 20} |
| Column Total Aggregates | {1, 3, 5, 10} | {2, 4, 10, 20} | Full data set Aggregates {1, 2, 3, 4, 5, 10, 10, 20} |

| Green |
|---|
| Red |

| Green |
|---|
| Red |

360

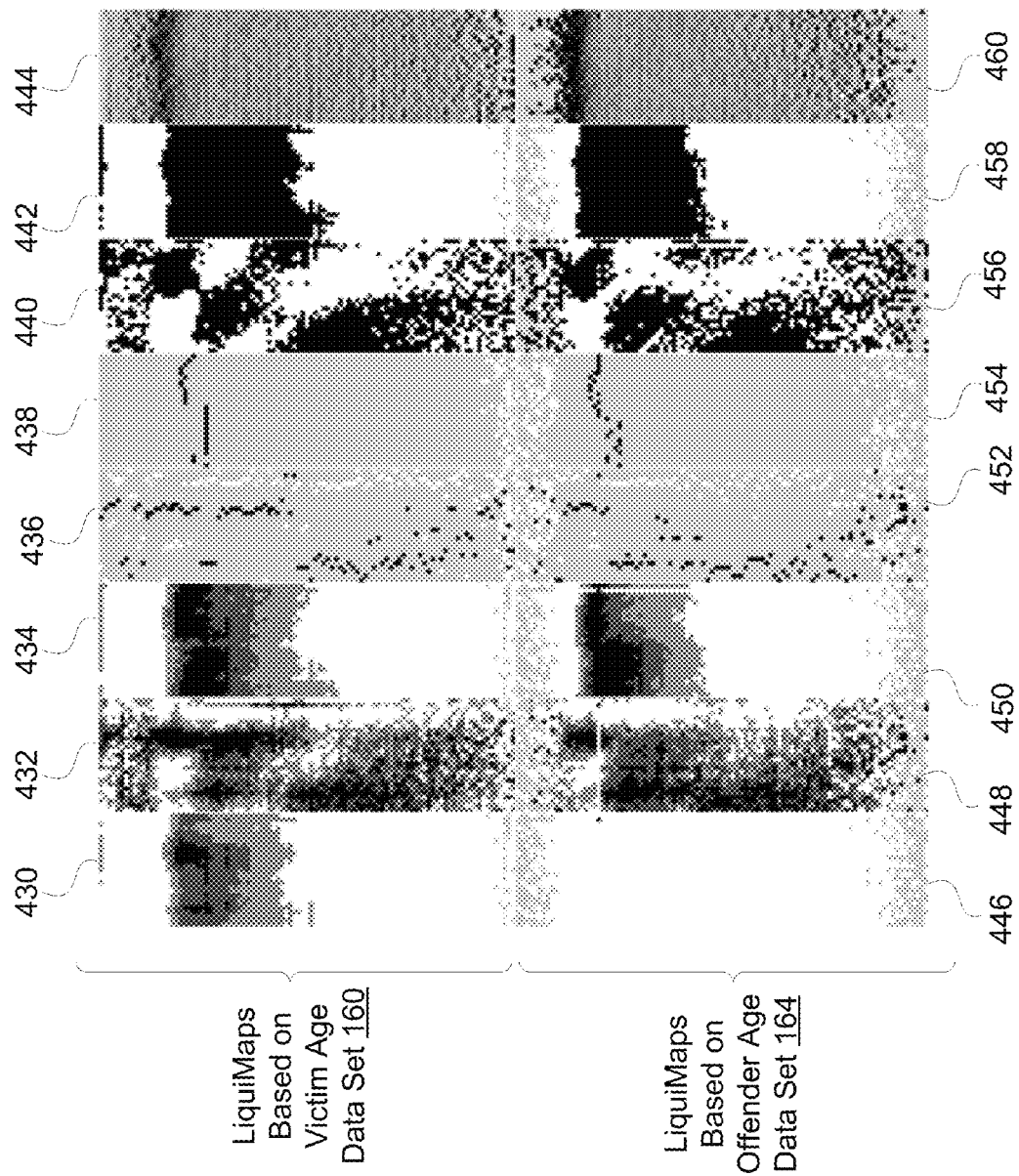

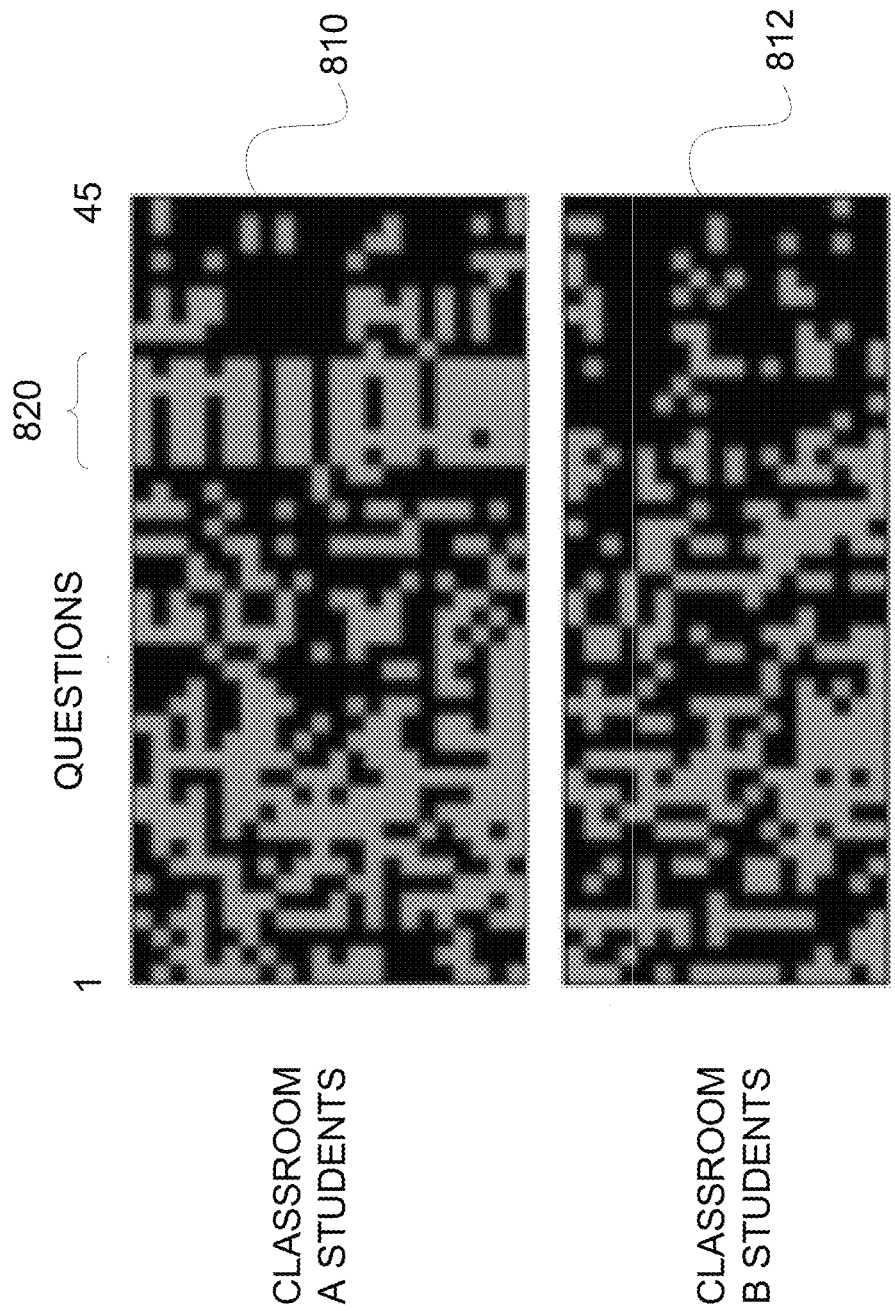

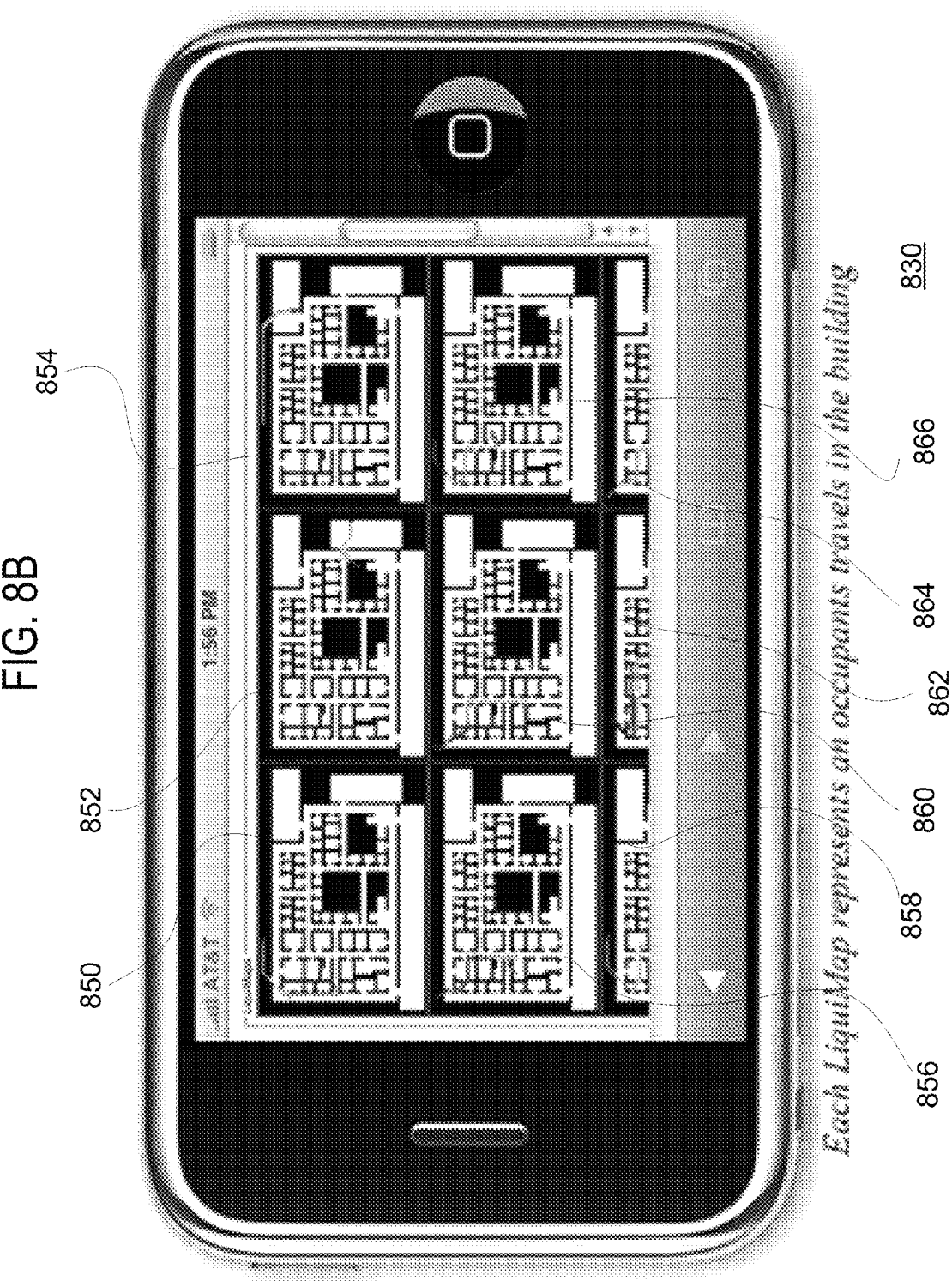

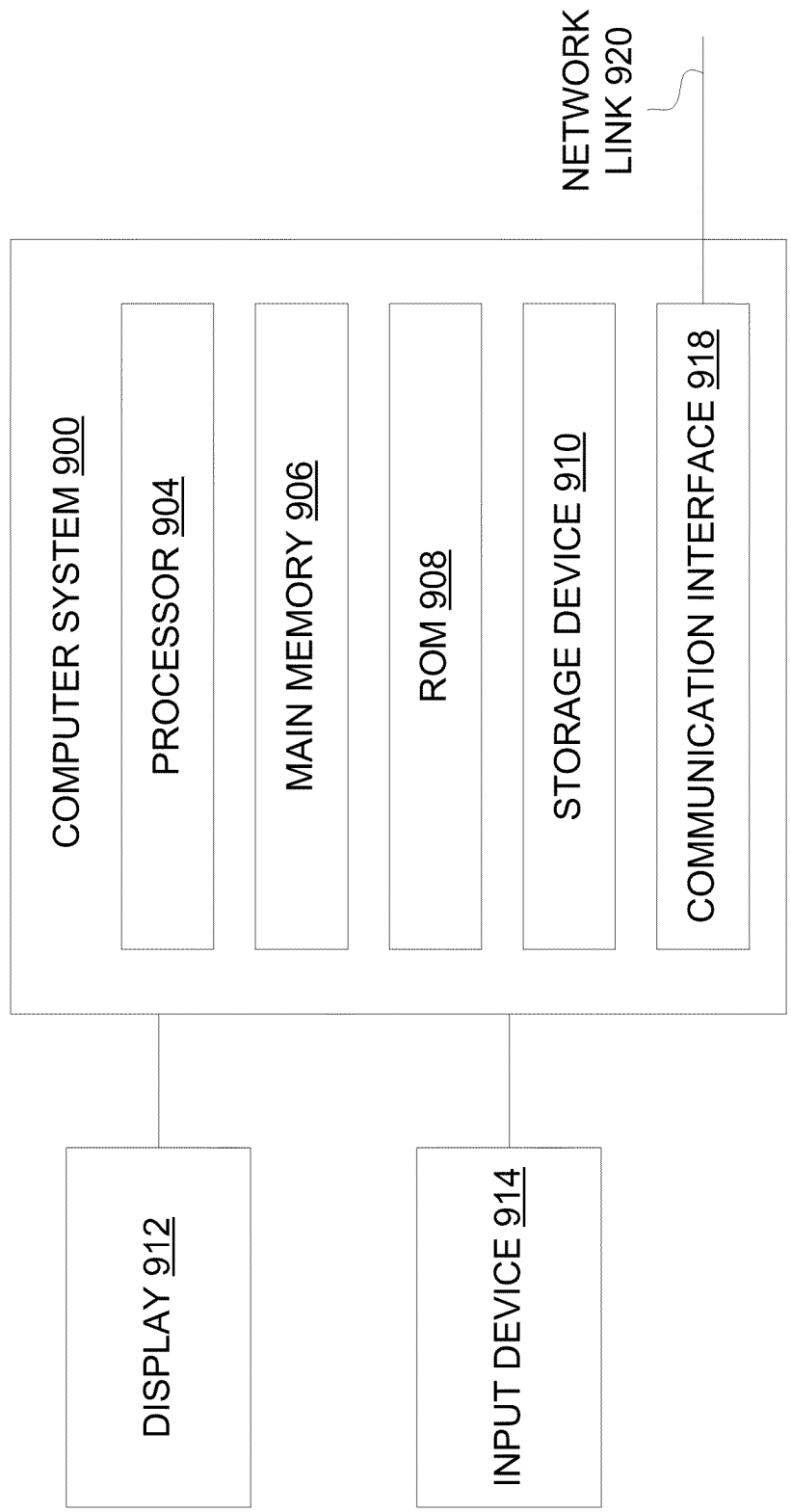

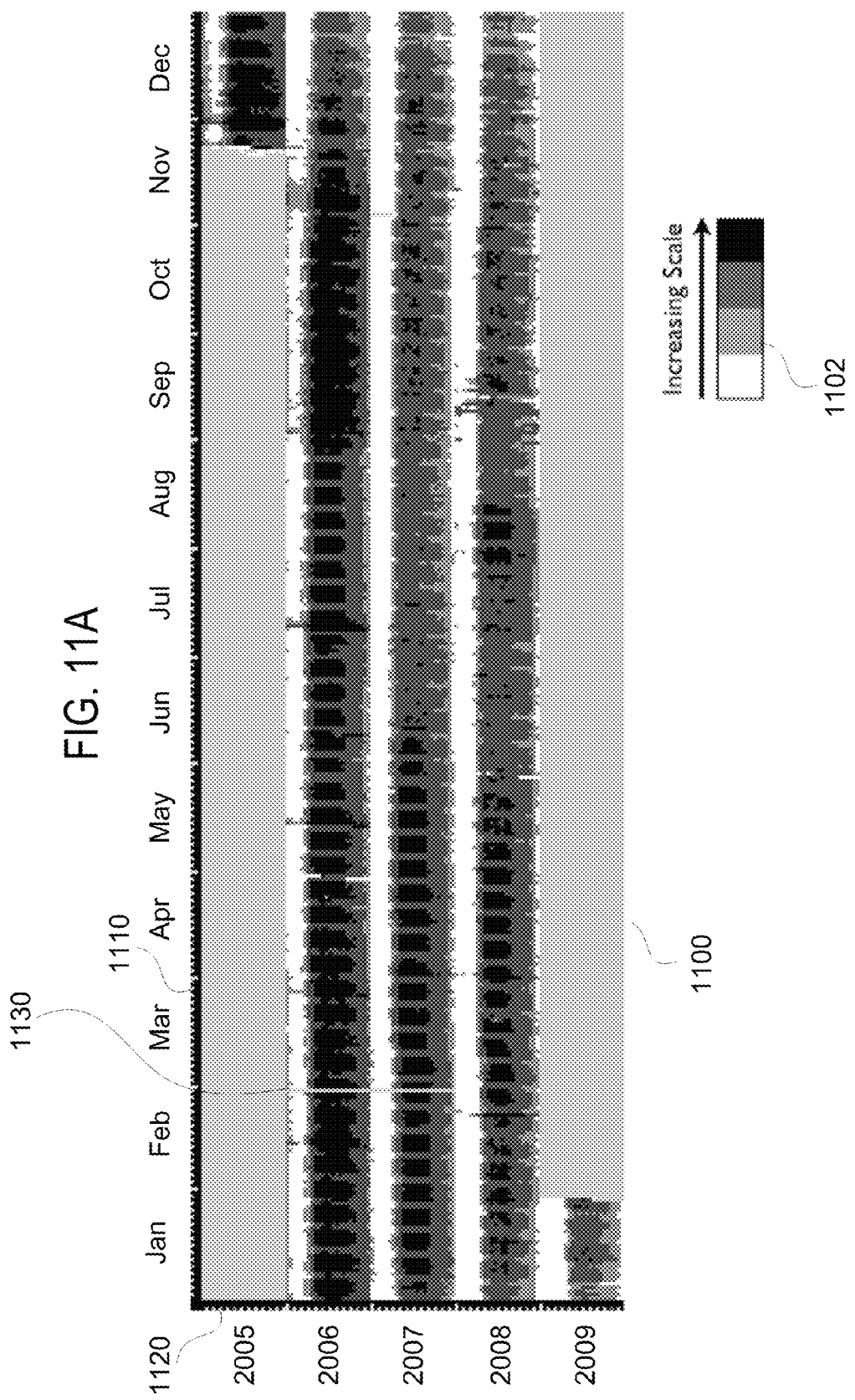

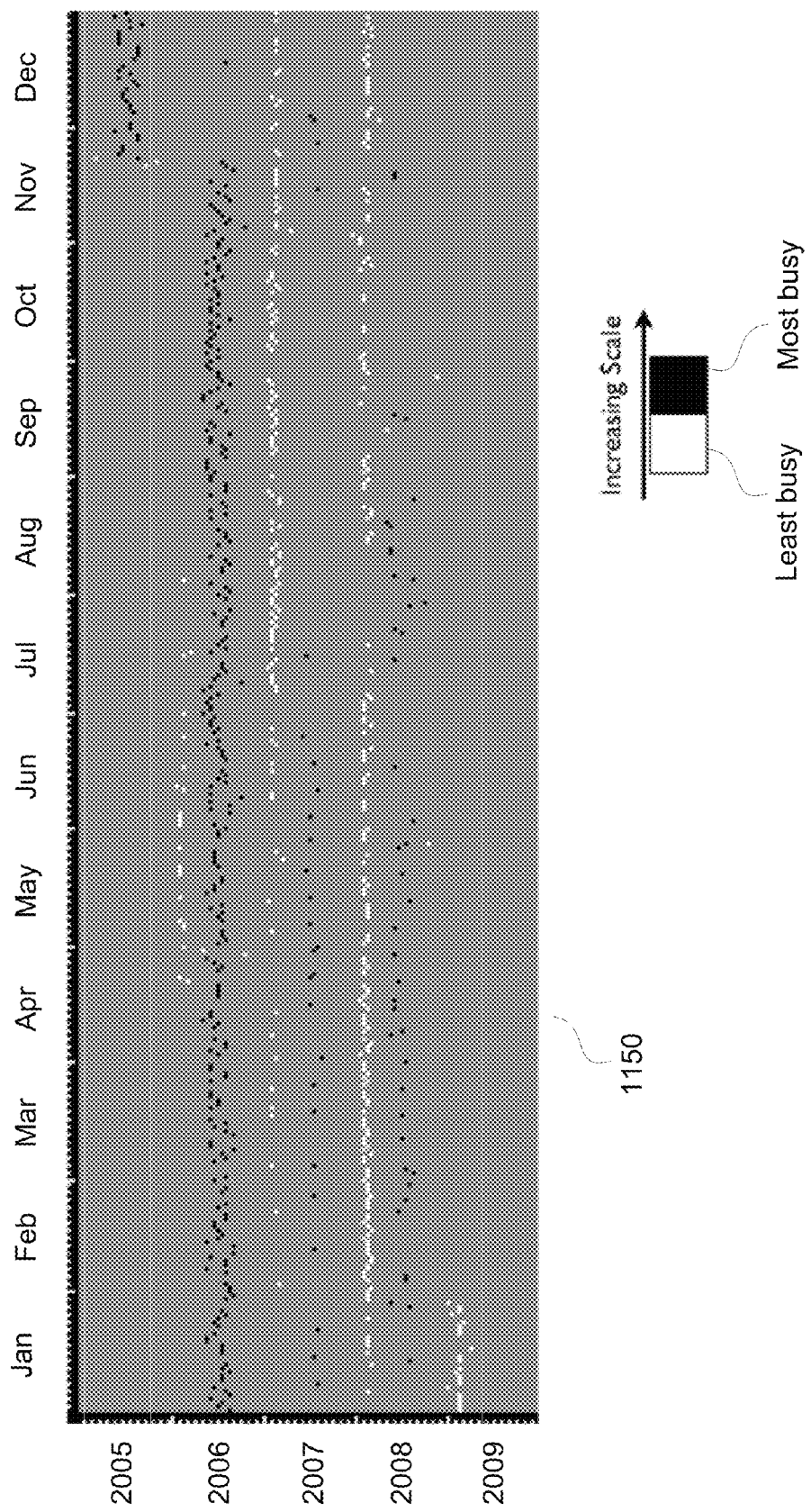

DYNAMIC GENERATION OF IMAGES TO FACILITATE INFORMATION VISUALIZATION

CLAIM OF PRIORITY

This application claims priority to U.S. provisional patent application No. 61/225,375, filed Jul. 14, 2009, entitled "System for Visualizing Patterns, Trends and Anomalies," by Steve Souza, the entire contents of which are incorporated by reference for all purposes as if fully set forth herein.

FIELD OF THE INVENTION

Embodiments of the invention relate to the dynamic generation of images that facilitate the analysis of large data sets.

BACKGROUND OF THE INVENTION

The use of computers and mechanized systems allow for the collection of vast amounts of data. Real-world decision making often is, or should be, based upon the analysis of large volumes of data. However, much of the data that is collected or otherwise available may never be analyzed. This is so because current approaches for analyzing data are often expensive, time consuming, and require highly trained analysts or complicated tools. Less expensive approaches, such as spreadsheets and graphs, may be helpful in analyzing small amounts of data, but are not well suited in accommodating large data sets in a clear and meaningful manner. Thus, it would be advantageous to provide improved approaches for analyzing large data sets.

SUMMARY OF THE INVENTION

Techniques are provided for generating a digital image that facilitates the analysis of data sets of any size, but in particular, large data sets. In an embodiment of the invention, a user may use a graphical user interface or other mechanism to issue a request that selects one or more data sets residing at one or more data sources. The request may also identify other information pertaining to how data from the one or more selected data sets should be grouped or collected. Upon receiving the request, a software application according to an embodiment of the invention arranges data from the selected data sources into a table (an "aggregate data table") in accordance with the information contained in the request.

Each cell of the aggregate data table may comprise a set of one or more values obtained from the one or more selected data sets. Data analysis may be performed on the values within each cell of the aggregate data table. As a result of performing the data analysis on the aggregate data table, a post-analysis table is created. Each cell of the post-analysis table comprises a single value that reflects the result of performing the data analysis on the aggregate data table.

Optionally, each cell of the post-analysis table may be mapped to a particular attribute, such as a color. The mapping may be determined in an embodiment by initially identifying a minimum value and a maximum value of the values stored within the aggregate data table, and thereafter, mapping the range of possible values between the minimum value and the maximum value to a set of colors supported by a particular digital image format. A digital image may be created by determining a color for each pixel of the digital image based on the particular color mapped to a corresponding cell of the post-analysis table.

The appearance of the digital image, created in this fashion, allows the viewer to quickly view the results of the data analysis performed on the data represented by the digital image, thereby enabling the viewer to ascertain trends, patterns, and/or anomalies in the data. In an embodiment, the digital image may act as a data proxy for the original data sets(s) by allowing the data values represented by the digital image to be obtained or displayed based on the color of the pixels of the digital image. Many other features that facilitate data analysis are presented herein.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 2 is a flowchart illustrating the functional steps of generating a digital image that facilitates data analysis according to an embodiment of the invention;

FIG. 3A is an illustration of a tabular data source;

FIG. 3B is an illustration of a aggregate data table according to an embodiment of the invention;

FIG. 3C is an illustration of a post-analysis table according to an embodiment of the invention;

FIG. 3D is an illustration of mapping the cells of a post-analysis table to a color according to an embodiment of the invention;

FIG. 3E is an illustration of the colors of a LiquiMaps created based on the color-assigned table depicted in FIG. 3D according to an embodiment of the invention;

FIG. 4B is an illustration of a plurality of LiquiMaps that were generated by performing different kinds of analysis to two different aggregate data tables according to an embodiment of the invention;

FIG. 8A displays two illustrative LiquiMaps depicting the results of a standardized test according to an embodiment of the invention;

FIG. 8B displays a LiquiMap depicting the movement of persons within a building according to an embodiment of the invention;

FIG. 9 is a block diagram that illustrates a computer system upon which an embodiment of the invention may be implemented;

FIG. 11A is a LiquiMap that depicts more than three years worth of web site page hits according to an embodiment of the invention;

FIG. 11C is a LiquiMap that depicts, for each calendar day, the busiest and least busy hour across all years for more than three years worth of web site page hits according to an embodiment of the invention.

DETAILED DESCRIPTION OF THE INVENTION

Figure 1A:
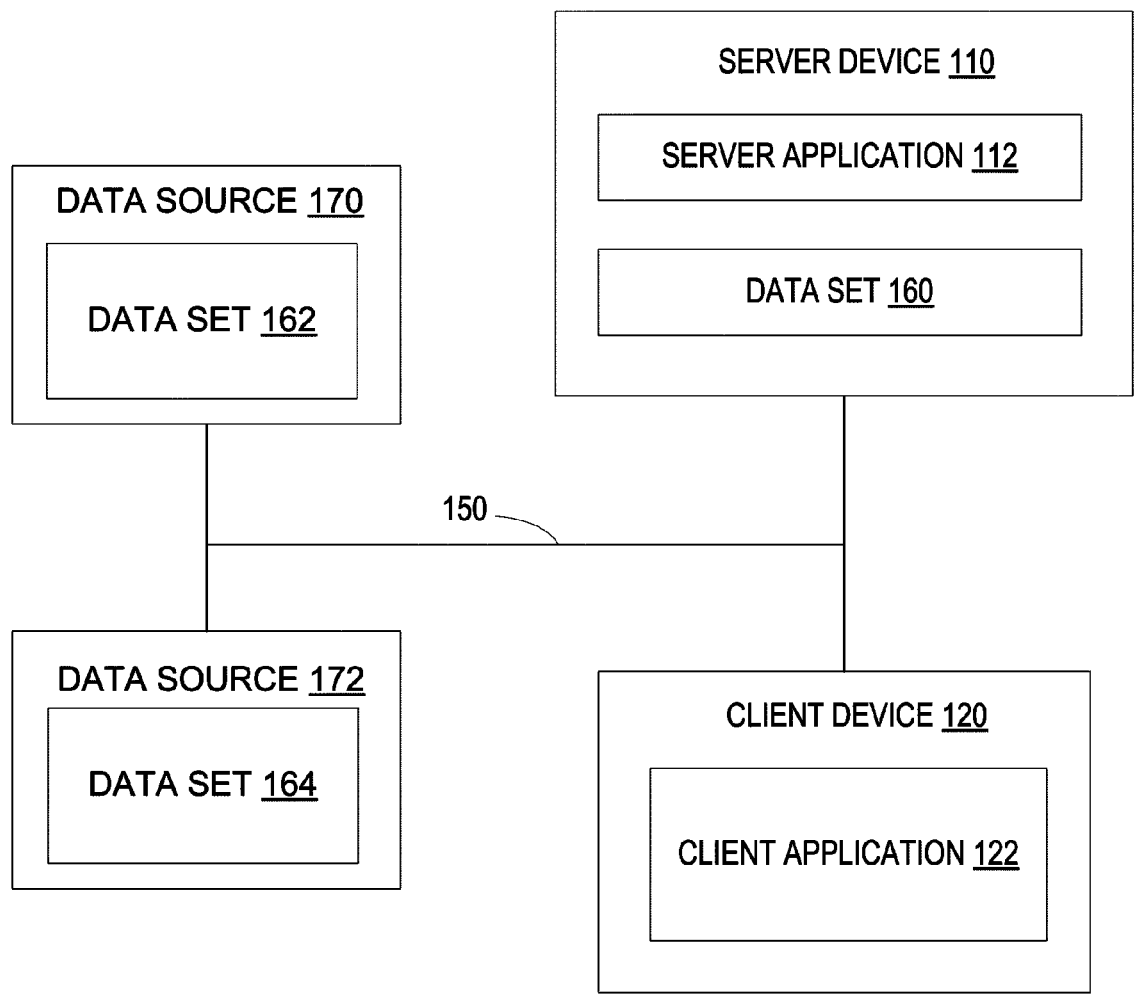
FIG. 1A is a block diagram of an illustrative system for generating one or more digital images according to one embodiment of the invention.

Approaches for generating one or more digital images that facilitate data analysis are described herein. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Functional Overview

Embodiments of the invention facilitate data analysis, such as the identification of trends, patterns, and/or anomalies, on any number of large data sets in an expeditious and intuitive manner. Indeed, a person performing data analysis according to an embodiment of the invention need not have any special training This is so because the approaches discussed herein provide for the generation of a special type of digital image (referred to herein as a "LiquiMap") that represents one or more properties of a data set. The appearance of the LiquiMap reflects analysis performed on the data set represented by the LiquiMap. For example, each pixel of the LiquiMap may represent a portion of data within a data set, and the color of each pixel may correspond to the result of performing one or more types of analysis on the portion of data represented by the pixel. Thus, simply by looking at a LiquiMap, one may make meaningful observations about the data represented by the LiquiMap.

While LiquiMaps share certain characteristics with a type of graphical representation known as a heat map, embodiments of the invention possess many features, characteristics, and extensions beyond those of current approaches. As an example, embodiments of the invention may be used to create a particular type of LiquiMap, referred to as a Data Proxy, which acts as a data proxy for data represented by one or more LiquiMaps. As shall be explained in more detail below, the colors of the pixels of a Data Proxy may be used to derive the original values of the data set which a LiquiMap represents. A Data Proxy may be generated for each data set represented by one or more LiquiMaps. Each LiquiMap may be associated with a Data Proxy. Since a Data Proxy associated with a LiquiMap may be used to derive the original data values of the data set represented by the LiquiMap, it is unnecessary to retrieve the original data values from the data set. Advantageously, this allows the values of the data represented by portions of a LiquiMap to be displayed to a user without incurring the delay of retrieving the values from the data source storing the data set. In this way, a user may select a portion of a LiquiMap by positioning a mouse pointer thereover to cause the data values represented by the selected portion to be displayed without accessing the original data source. Other embodiments of the invention may enable a user to display the data values represented by a LiquiMap in other ways, e.g., by enlarging (or "zooming in on") the display of the LiquiMap.

In certain embodiments of the invention, by selecting a portion of a LiquiMap, a user may cause a certain type of analysis to be performed on the data represented by the selected portion of the LiquiMap. For example, a user may select an area of a LiquiMap that is displayed using the color red. By selecting the red area on the LiquiMap, a formula (which may be either pre-configured or dynamically selected) may be applied to the data associated with the selected red area of the LiquiMap, and thereafter, the appearance of the LiquiMap may be updated to reflect the outcome of the formula on the data associated with the selected red area.

The above discussion illustrates several illustrative embodiments, but is not meant to enumerate a complete list of new or novel features, as many other approaches and techniques are presented below. To facilitate such explanation, the architecture of several illustrative embodiments will now be presented.

Architecture Overview

Embodiments of the invention may be implemented using a variety of different architectures. FIG. 1A is a block diagram of an illustrative system 100 according to one embodiment of the invention. System 100 depicts an embodiment implemented using a typical client/server model. System 100 includes server device 110, client device 120, and communications link 150. Server device 110 may execute server application 112, while client device 120 may execute client application 122. System 100 may be used to generate one or more LiquiMaps that facilitate the analysis of one or more large data sets. Data represented by a LiquiMap may originate from one or more sources of data ("data sources"), such as server device 110, client device 120, and/or data sources 170 and 172.

Server device 110, as broadly used herein, refers to any machine which can execute server application 112. Server application 112 is a software application that is responsible for generating a LiquiMap. The process that server application 112 follows in generating a LiquiMap shall be explained in greater detail below with reference to FIG. 2. Non-limiting illustrative examples of server device 110 include, without limitation, a server, a personal computer (PC), a laptop computer, a tablet computer, a cell phone, a personal digital assistant (PDA), a tablet computer, and the like. Server application 112 may be implemented as a single entity (such as shown in FIG. 1A) or as multiple entities that may be implemented on one or more physical machines. Consequently, the functions attributed to server application 112 may be implemented using a variety of different computing entities.

Client device 120, as broadly used herein, refers to any machine which can execute client application 122. Client application 122 is a software application that is responsible for rendering a LiquiMap on a display, e.g., client application 122 may be implemented using a web browser or any software application capable of displaying an image. Non-limiting illustrative examples of client device 120 include, without limitation, a personal computer (PC), a laptop computer, a tablet computer, a cell phone, a personal digital assistant (PDA), a tablet computer, and the like. While server device 110 and client 120 may be implemented using a wide range of computer devices, certain embodiments may implement client device 120 using a portable device. Client application 122 may be implemented as a single entity (such as shown in FIG. 1A) or as multiple entities that may be implemented on one or more physical machines. Consequently, the functions attributed to client application 122 may be implemented using a variety of different computing entities.

One or more of server device 110, client device 120, and data sources 170 and 172 may communicate with or otherwise access each other over communications link 150. Communications link 150 may be implemented by any medium or mechanism that provides for the exchange of data. Non-limiting, illustrative examples of communications link 150 include, without limitation, a network such as a Local Area Network (LAN), Wide Area Network (WAN), Ethernet or the Internet, one or more terrestrial, satellite or wireless links, and serial or parallel cables.

Server application 112 may retrieve data from or otherwise access one or more sources of data (individually referred to as a "data source"), such as data sources 170 and 172. Server device 110 and client device 120 may also each act as a data source. A data source is any location where one or more data sets may be stored. The one or more data sets stored at each data source may provide data which can be analyzed using embodiments of the invention. One or more characteristics of the data retrieved from data sources may be represented by one or more LiquiMaps according to embodiment of the invention.

In an embodiment, a data set, stored at a data source, may be a tabular data set which comprises any number of rows and columns. Typically, in a tabular data set, a row or tuple represents a specific instance of data, and each column represents a different property which an instance of data may possess. Non-limiting, illustrative examples of data sets include spreadsheets, pivot tables, result sets returned from a database, flat files, maps (such as geographical maps and floor plans), images, and LiquiMaps. Essentially, there is no limitation to how the data which may be analyzed using embodiments of the invention may be represented.

The data that is used in the creation of each LiquiMap need not come from the same data set nor be the same type of data. In an embodiment, as long as data can be uniquely identified by the same key, the data can originate from any combination of different data types or sources. For example, data for a specific LiquiMap may originate from both a spreadsheet and multiple database tables. As another example, a LiquiMap may represent data from two or more data sets (as well as data from a single data set).

A data set may be stored at any data source that is accessible to server application 112. Embodiments of the invention may employ any number of data sets; thus, while three data sets are depicted in FIG. 1A, other embodiments may employ a single data set or two or more data sets.

There are no limits to the types of problems which may be analyzed by embodiments of the invention. A data set may represent any type of data and there are no limits to what the data in a data set may represent. For example, data sets 160, 162, and 164 may each represent different types of data, such as, but not limited to, time series data, scientific data, business data, and government data. Thus, there is no limit to the types of things in the real-world which may be analyzed by a LiquiMap, and the specific examples discussed herein are meant to illustrate certain features of embodiments without limiting the scope of data which may be analyzed using a LiquiMap.

Figure 1B:
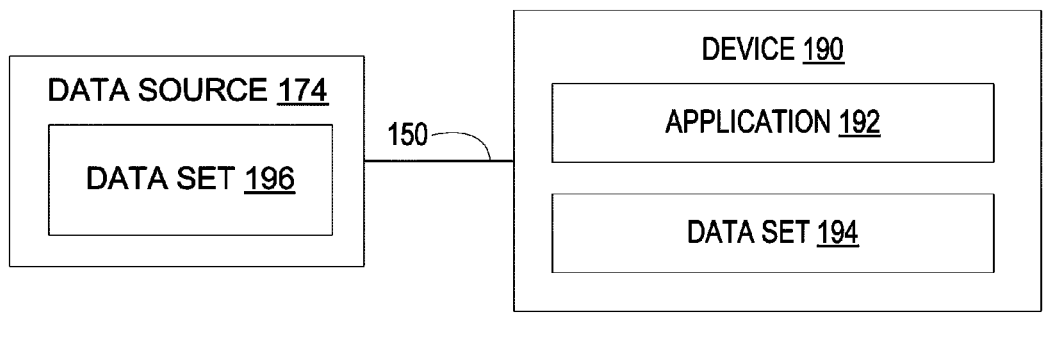
FIG. 1B is a block diagram of an illustrative system for generating one or more digital images according to another embodiment of the invention.

In the embodiment shown in FIG. 1A, server device 110 and client device 120 are depicted as being separate entities; however, in other embodiments of the invention, such as system 180 of FIG. 1B, the functions performed by server application 112 and client application 122 may be performed by a single application 192 executing on a single device 190. Application 192 may generate a LiquiMap based on data stored at any location accessible to application 192, e.g., application 192 may analyze data originating at one or more of data set 194 stored on device 190 and/or data set 196 stored at data source 174.

Embodiments of the invention may be implemented in other architectures not depicted by FIGS. 1A and 1B. For example, embodiments of the invention may be implemented using a three-tier architecture model or using a cluster of devices for fault tolerance and/or performance reasons. As another example, in certain embodiments LiquiMaps may be displayed on a handheld device (such as a cell phone or portable computer), and the LiquiMap may be generated by the handheld device or provided to the handheld device by a remote server. Having described the architecture of illustrative embodiments of the invention, the process of generating a LiquiMap shall now be described according to an embodiment of the invention.

Generating a Liquimap

FIG. 2 is a flowchart illustrating the functional steps of generating a digital image (referred to herein as a "LiquiMap") that facilitates data analysis according to an embodiment of the invention. Initially, in step 210, server application 112 may arrange values of one or more selected data sets into a table (the "aggregate data table"). The purpose of performing step 210 is to enable embodiments to aggregate the data that a user wishes to analyze and/or perform computations (such as column or row totals) on. Note that step 210 is optional, as certain embodiments may not perform step 210. For example, certain embodiments of the invention may start with data arranged in an aggregate data table, as thus the performance of step 210 would not be necessary. Also, certain embodiments of the invention may operate on the raw data, as opposed to any arrangement or aggregation of data performed in step 210, which may render the performance of step 210 unnecessary.

Step 210 may be performed in response to server application 112 receiving a request from a user to generate a LiquiMap. The request may contain selection data that identifies one or more data sets. A user may use a user interface, such as a graphical user interface displayed on a web page, to specify the selection data that identifies the one or more data sets. Additionally, the selection data may also identify one or more columns of a data set to serve as a key for the data set. The one or more columns that serve as a key (the "key columns") may be used by server application 112 in grouping values of the one corresponding data set into corresponding cells of the aggregate data table. Any approach for identifying key columns may be used by embodiments, as the one or more key columns may be identified in a variety of different ways. Note that in certain circumstances it may not be necessary for a user to identify a key column to create an aggregate data table in step 210, as the selected data set(s) may already be arranged in an aggregate data table form or the key column for the selected data set(s) may be already known or identified to server application 112.

To illustrate an example, consider FIG. 3A, which is an illustration of data set 300. Data set 300 has columns 302, 304, and 306. For illustrative purposes, assume that step 210 is performed in response to a user selecting data set 300 as well as column 302 as a key column. In this example, step 210 may be performed by server application 112 creating aggregate data table 310 as shown in FIG. 3B.

As depicted in FIG. 3B, cells of aggregate data table 310 may store one or more values. For example, cell 322 at the intersection of row 318 and column 314 contains the values 1 and 3 because one row having a value of "A" in the key column of tabular data source 300 had a value of "1" in column 304, and another row having a value of "A" in the key column of tabular data source 300 had a value of "3" in column 304. Aggregate data table 310 may be maintained in memory or may be persistently stored by server application 112.

In an embodiment, aggregate data table 310 may optionally store additional information about the contents of the aggregate data table. For example, row 324 may store column total aggregates, while column 325 may store row total aggregates as shown in FIG. 3B. The results of additional types of calculations on the selected data set(s) may be included in the aggregate data table. For example, in certain embodiments, an aggregate data table created in step 210 may include one or more of the following computations about the selected data sets or any portion thereof: average value, minimum value, maximum value, medium value, standard deviation, and the mode. Embodiments may store any type of computation or summarization of the data set in the aggregate data table. Such optional information may be helpful for use in the performance of later steps of FIG. 2.

For purposes of providing a clear example, the steps of FIG. 2 shall be explained with reference to data set 300 being the sole data set selected in step 210, although any number of data sets may be selected in step 210.

In step 220, server application 112 performs one or more types of analysis on the data stored in each cell of the aggregate data table to generate another table (the "post-analysis table"). In an embodiment, server application 112 may perform a type of analysis to the data stored in each cell of the aggregate data table by applying one or more types of formulas to the data. The one or more formulas applied to data stored in the aggregate data table may be selected by a user for the purpose of analyzing the data stored within the aggregate data table. As a result of applying the one or more formulas in step 220, each cell of the post-analysis table comprises a single value. In an embodiment where an aggregate data table is not expressly created in step 210, then in step 220 server application 220 may perform one or more types of analysis on one or more selected data sets.

As with the aggregate data table of step 210, the post-analysis table may be maintained in memory or may be persistently stored. Once the post-analysis table is created in step 220, certain embodiments may not continue to maintain the aggregate data table created in step 210 (although other embodiments may do so).

To illustrate an example of performing step 220, consider FIG. 3C, which is an illustration of post-analysis table 330 according to an embodiment of the invention. Post-analysis table 330 is the result of performing step 220 on aggregate data table 310 of FIG. 3B by an embodiment. Post-analysis table 330 of FIG. 3C depicts a single value in each cell determined by the application of an illustrative formula (the "example formula") which results in (a) a value of 1 if the average of the data values of a cell are less than the average of the data values stored in all cells of aggregate data table 310 and (b) a value of 2 if the average of the data values of a cell are equal to or greater than the average of the data values stored in all cells of aggregate data table 310. Thus, by applying the example formula to the values {1, 3} stored in cell 322 of aggregate data table 310 of FIG. 3B, a value of 1 is stored in cell 332 of post-analysis table 330 of FIG. 3C because the average value of 1 and 3 is 2, which is less than the average of all the data values in all cells of aggregate data table 310.

Note that the data stored in row 324 and column 326 may be helpful in this calculation, which is a reason why such data may be stored in data aggregate table 310. Also note that the data stored in row 324 and column 326 may also be present in post-analysis table 330, as shown in FIG. 3C (some embodiments may not include such information in post-analysis table 330).

Embodiments of the invention may perform any type of analysis or apply any type of formula to data stored in one or more cells of the aggregate data table created in step 210. While several illustrative types of analysis which may be performed in step 220 will be discussed herein in reference to specific examples, embodiments of the invention are not limited to the performance of any type of analysis or the application of any type of formula in step 220.

Note that the performance of step 220 is optional, as certain embodiments may not perform step 220. To illustrate, a user may desire to create a LiquiMap that depicts characteristics of the raw or unprocessed data in the data sets selected in step 210, in which case it may not be necessary for server application 112 to perform step 220. In such an embodiment, aggregate data table 310 would effectively be post-analysis table 330.

In step 230, server application 112 maps the value stored in each cell of the post-analysis table to a particular attribute, such as a color. The result of mapping the values of the post-analysis table to various colors according to an embodiment may be represented in a new table (the "color-assigned table"). Embodiments of the invention may employ any scheme or approach for mapping a data value in a cell of the post-analysis table to an attribute, such as a color.

To illustrate one approach for performing step 230, consider FIG. 3D, which is an illustration of mapping the cells of post-analysis table 330 to a color according to an embodiment of the invention. As shown in color-assigned table 350 of FIG. 3D, each cell of color-assigned table 350 has been mapped to a color using a scheme where the value 1 is mapped to the color green and the value 2 is mapped to the color red. While the mapping in this example is relatively straightforward, other more sophisticated approaches for determining the mapping may be employed by other embodiments.

Creation of a Data Proxy

In an embodiment, the mapping employed in step 230 may be used to create a Data Proxy. A Data Proxy is a particular type of LiquiMap that may be used to derive the original data values of the original data set or, in some cases, the aggregate data table or the post-analysis table. A Data Proxy is a convenient, portable way to compress and store the data of a data set because, as a Data Proxy is a digital image, a Data Proxy enjoys the benefits of other digital images by being capable of being analyzed, compressed, and/or stored by a variety of techniques. A Data Proxy may be created for each data set represented by one or more LiquiMaps. Thus, even if a Data Proxy is not specifically requested to be created, embodiments may nevertheless generate and maintain a Data Proxy in association with LiquiMaps representing features of a data set or a post-analysis table on which the Data Proxy is based.

To create a Data Proxy, embodiments may base the mapping of a value in a data set (which may be a post-analysis table in some cases) to a particular color, at least in part, upon the number of colors supported by the type of digital image in which the Data Proxy will be created. Server application 112 may initially identify the range of actual values present within the data set, and thereafter, map each value, in the range of actual values present within the data set, to one of the colors supported by the type of digital image in which the LiquiMap will be created.

For example, a variety of digital image formats (such as a Portable Network Graphics (PNG) digital image) support about four billion different color values. The supported colors of a digital image format are typically arranged in a sequence, and each color may be uniquely identified by its position in the sequence. Assume that a particular data set comprises a plurality of values having a minimum value of 54 and a maximum value of 427. Thus, values in the data set would span a range of 373 values (determined by the difference between the maximum and minimum values). Each of those 373 values may be mapped to one of the four billion color values supported by the digital image format intended to be used.

Fractions or decimals values may also be mapped to a color that represents the exact or approximate value. For example, in this example, 373 divided by 4 billion is 0.00000009325. Thus, each individual color supported by the digital image format may represent an increment of 0.00000009325 between the values 54 and 373. In other words, the first supported color may represent 54, the second supported color may represent 54.00000009325, and so on. A fraction or decimal value may be mapped to a particular color that represents the exact or closest value to the fraction or decimal value.

The above example assumes that four bytes are used to identify a color (thereby yielding around 4 billion different colors). However, embodiments of the invention may use more or less bytes to accommodate the particular needs of the embodiment. A user or a software process may inspect the data within the data set (which may be, for example, the original data set, the post-analysis table, or the aggregate data table), and thereafter determine that 4 billion colors is more colors than is required to analyze the data. As a result, the user or software process may then may adjust how many colors (and by extension how many bytes) are used to represent the data.

To illustrate a concrete example, assume that the data present within a post-analysis table corresponds to whole percentages that range in value from 0 to 100%. Thus, can be only 101 different values within the data. A user or software process may determine that there is no need to use four bytes worth of different colors to represent this data, as approximately 4.2 billion ($2^{32}$) values can be represented by four bytes, and only 101 different colors are needed to identify all possible values. Thus, 101 different states (i.e., colors) may be represented by 7 bits as $2^7=128$. As a result, each pixel could represent four different data values plus 4 bits from a fifth data value (4*7+4=32 bits or four bytes).

Also, if the data within a particular post-analysis table has a wide data range (for example, 1,000,000), and yet a great degree of precision is not required, then an embodiment may divide the range of data into chunks of 100,000, thereby allowing the data to be grouped into 10 different states that may be represented by 4 bits ($2^4=16$ different states, which is more than enough to represent 10 different states). These techniques are equally applicable to the generation of a LiquiMap as well as to the generation of a Data Proxy.

Embodiments of the invention may support even greater precision by using multiple pixels to represent a single data value. For example, as explained above, the color value associated with each pixel of a LiquiMap may represent 1 distinct value in 4 billion values using four bytes to represent the color of each pixel. Thus, if two pixels (corresponding to eight bytes) of a LiquiMap are used to represent a data value, then the color values associated with those two pixels may represent 1 distinct value in 1.8E19 values (which is about 18 billion values). Thus, if greater precision is desired than is provided by mapping the color value associated with a single pixel of a LiquiMap to a data value, then the color values associated with additional pixels may be used until the desired precision is realized. Note that if you increase the number of bits used to identify the color representing a data value by 1, one may double the amount of different colors that can be represented. In other words, adding one bit from $2^{32}$ to $2^{33}$ doubles the number of potential colors that can be represented (from 4,294,967,296 to 2(4,294,967,296) or 8,589,934,592). According, the granularity can be grown or shrunk one bit at a time based on a tradeoff between precision and compression.

While embodiments of the invention shall chiefly be described with reference to performing step 230 by server application 112 mapping the value of a data set, such as the values stored in each cell of the post-analysis table, to a particular color, other embodiments of the invention may perform step 230 by mapping values to a different attribute, such as a sound, another number, or a word, for example. To illustrate, if each cell of the post-analysis table was mapped to a particular sound, then when a visually challenged person touches a screen displaying a LiquiMap, the sound mapped to the touched portion of the LiquiMap may be played, thereby allowing the visually challenged to enjoy use of embodiments of the invention.

The particular attribute to which each cell of the post-analysis table is mapped may be selected based on the primary sense which is anticipated to be used by the intended user base of the LiquiMap. For example, if the intended user base of a LiquiMap is anticipated to perceive a LiquiMap by touching the LiquiMap (e.g., by running their fingers over a display depicting the LiquiMap), then temperature or texture may be used, as an example, to distinguish between different characteristics of the data. Thus, while it is contemplated that the majority of audiences of a LiquiMaps will perceive the LiquiMap using the sense of sight (thereby making color an attractive attribute to map each cell of the post-analysis table in step 230), embodiments of the invention are not limited by differentiating between characteristics of a data set using only color, as step 230 may be performed by mapping each cell of the post-analysis table to any attribute which may be perceived by any sense of the intended user base of the LiquiMap.

Generating Liquimaps

In step 240, in an embodiment, server application 112 generates a LiquiMap using the mapping determined in step 230. Server application 112 may generate a LiquiMap such that the color of each pixel of the LiquiMap corresponds to the particular color mapped to a corresponding cell in the color-mapped table determined in step 230. To illustrate, consider FIG. 3E, which is an illustration 360 of the colors of the pixels of a LiquiMap created based on the color-assigned table 350 of FIG. 3D. As shown in FIG. 3E, illustration 360 depicts a digital image having two rows of two pixels each, where the top row is comprised of green pixels and the bottom row is comprised of red pixels. In this way, simply by viewing the LiquiMap represented by illustration 360, one can easily see which portions of data are below average and which are above average.

Figure 3F:
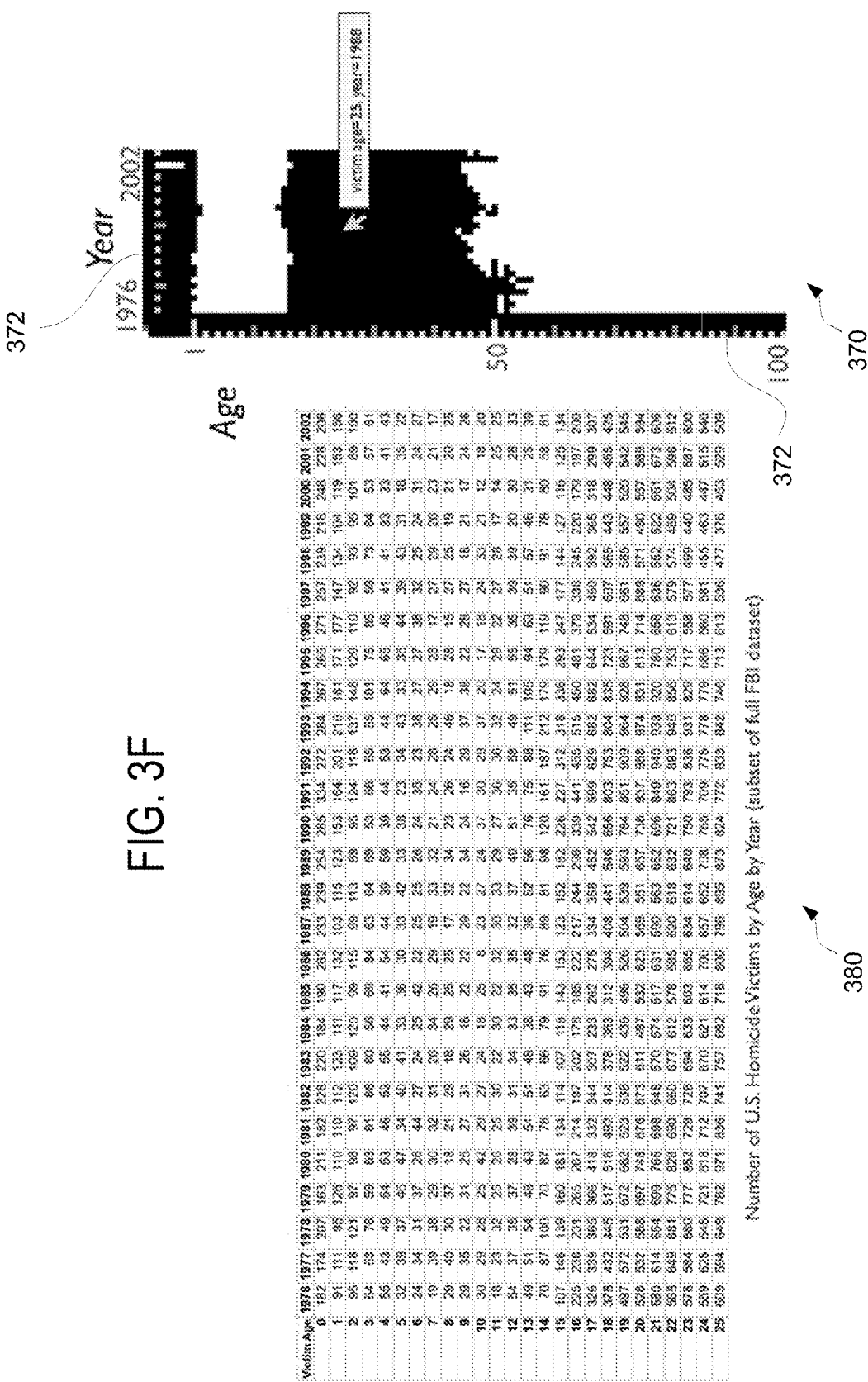
FIG. 3F is an illustration of a LiquiMap and a data set represented by the LiquiMap according to an embodiment of the invention.

To illustrate the actual appearance of an illustrative LiquiMap in a more complex example, consider FIG. 3F, which is an illustration of LiquiMap 370 and data set 380 represented by LiquiMap 370 according to an embodiment of the invention. Note that the portion of data set 380 depicted in FIG. 3F is a subset of the entire data set, which includes data about homicide victims from age 1 to age 100. The color of each pixel of LiquiMap 370 is based upon whether the data within a corresponding cell of data set 380 is above or below the average value in data set 380. Thus, by looking at LiquiMap 370, one is able to more easily ascertain trends (such as what are the most common ages of homicide victims) than simply by looking at the raw data of data set 380.

In an embodiment, when server application 112 generates a LiquiMap, server application 112 may also create a Data Proxy if a Data Proxy associated with the data set represented by the LiquiMap is not already maintained or accessible to server application 112. Server application 112 may store data within the Data Proxy that identifies the minimum value and the maximum value of the values in the post-analysis table that were identified in step 230 (hereafter identified as "the minimum value" and the "maximum value" respectively). For example, the color of one or more pixels of the Data Proxy may identify the minimum value and maximum value according to a certain encoding scheme. Alternately, data identifying the minimum value and the maximum value may be maintained separately, but in association with, the Data Proxy. As shall be explained in further detail below in the next section, keeping a record of the minimum value and maximum value in association with the Data Proxy advantageously enables the Data Proxy to act as a proxy for the original data set.

When server application 112 creates a Data Proxy in step 240, server application 112 may also store calculations or other metadata (i.e., data describing the data stored within the aggregate data table) using the colors of pixels of the Data Proxy. For example, a Data Proxy may contain a row or column of pixels, where the color of each pixel indicates information about a column or row of the aggregate data table, such as data stored within row 324 or column 326. Any type of statistics about the data portrayed in a Data Proxy may be recorded in this fashion. It may be advantageous to store such information using the color of pixels of the Data Proxy because digital image processing is very quick, efficient, compressed, and widely supported by many applications, computer languages, and operating systems.

In step 250, server application 112 may send the LiquiMap created in step 240 to client application 122 for display on client device 120. Note that not all embodiments may perform step 250, as certain embodiments may generate a LiquiMap on client device 120, thus making step 250 unnecessary. In certain embodiments, server application 112 may send, to client application 122, information identifying the minimum value and the maximum value for a particular LiquiMap when sending the LiquiMap to client 120 if the particular LiquiMap does not itself identify the minimum and maximum value in some manner.

A LiquiMap may be of any shape and size, although typically a LiquiMap is created as a rectangle having a size that is convenient for display in its entirety. Often, patterns and trends are visible within a displayed thumbnail of the LiquiMap. Thus, trends, patterns, and anomalies within many large data sets may be analyzed or monitored in a small display area. As a result, there are no limitations to a size or shape of a LiquiMap. Also, in an embodiment, the shape of a LiquiMap may, but need not, correspond to or reflect the dimensions of the aggregate data table created in step 210.

Figure 4A:
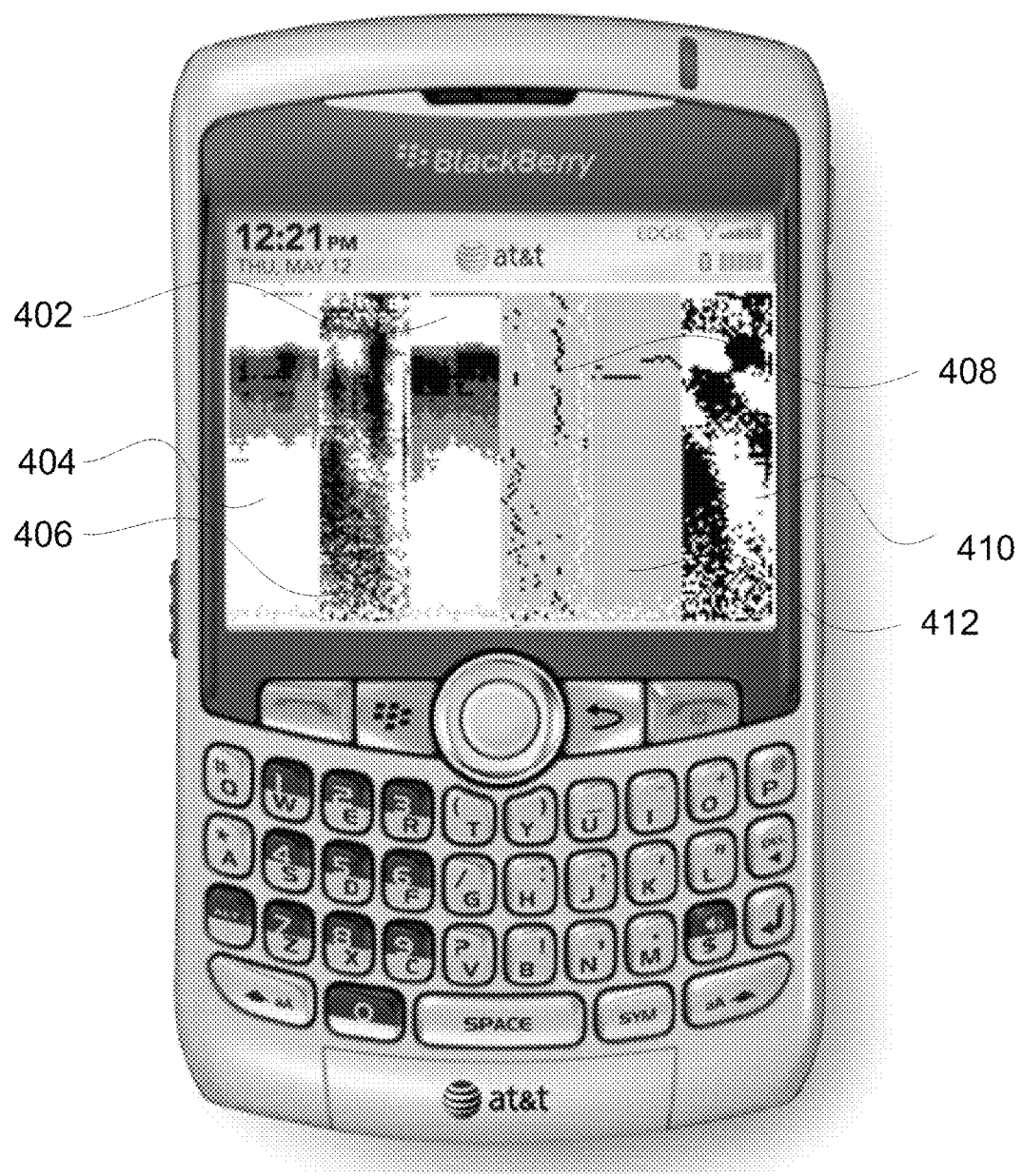
FIG. 4A is an illustration of a portable device displaying a plurality of LiquiMaps according to an embodiment of the invention.

In an embodiment, a user may instruct client application 122 to display a plurality of LiquiMaps on a display simultaneously, thereby making it easier to analyze the data by viewing data from different perspectives (i.e., by showing the results of different types of data analysis). For example, FIG. 4A depicts a portable device displaying a plurality of LiquiMaps, namely LiquiMaps 402, 404, 406, 408, 410, and 412, according to an embodiment of the invention. As shown in FIG. 4A, the size of a LiquiMap may be configured such that a plurality of LiquiMaps may be conveniently displayed on a portable device at the same time. Further, even though the LiquiMap is displayed in relatively small dimensions, trends and anomalies may still be identified in the data because the colors of the pixels in the LiquiMap are still easily visible.

It is noted that the portable device shown in FIG. 4A displays six different LiquiMaps that represent characteristics of the same aggregate data table. Thus, each of LiquiMaps 402, 404, 406, 408, 410, and 412 may be created by embodiments using a different set of formulas with the same aggregate data table. Note that embodiments may maintain any number of aggregate data tables at a time. In general, if the number of aggregate data tables is represented by M and the number of formulas is represented by N, then the number of LiquiMaps that may be simultaneously created is M*N. This is so because any formula may be applied against any aggregate data table. Since formulas operate on numbers, it is immaterial with respect to a formula as to what the numbers actually represent in the physical world.

Simultaneous Creation of Multiple Liquimaps

A user may issue, in step 210, a request to perform multiple types of analysis on one or more data sets. A plurality of different LiquiMaps may be simultaneously generated based on the different selected data sets and/or different types of analysis to perform on a selected data set. To illustrate, FIG. 4B depicts a plurality of LiquiMaps (LiquiMaps 430-460) that were simultaneously generated by performing different kinds of analysis to different aggregate data tables according to an embodiment of the invention. In the example of FIG. 4B, the top row of eight LiquiMaps depicted in FIG. 4B (i.e., LiquiMaps 430-444) were generated by server application 112 using data from an aggregate data table comprising data about the age of certain homicide victims using data originating from a first data set (for example, data set 160 of FIG. 1A), and the bottom row of eight LiquiMaps depicted in FIG. 4B (i.e., LiquiMaps 446-460) were generated by server application 112 using data from a different aggregate data table comprising data about the age of certain homicide offenders using data originating from a different data set (for example, data set 164 of FIG. 1B). The creation of the sixteen LiquiMaps depicted in FIG. 4B may be requested by a user in a single request to server application 112 by specifying which formulas to apply against which data sets. In turn, server application 112 may create any number of requested LiquiMaps simultaneously against any number of data sets.

As shown in FIG. 4B, each column of two LiquiMaps was created using the same type of analysis. For example, the same formulas were used by server application 112 in the creation of (a) LiquiMaps 430 and 446, (b) LiquiMaps 432 and 448, and (c) LiquiMaps 434 and 450, etc. Thus, while the top LiquiMap in each column was based on a different data set than the bottom LiquiMap in each column, the formulas applied to each data set in each column were the same. In this manner, trends, patterns, and/or anomalies may easily be perceived in each data set as well as differences in trends, patterns, and/or anomalies between multiple data sets.

Creation of Dynamic Ruler Markings on a Liquimap

In an embodiment, when a user issues a request to create a LiquiMap, the user may identify whether the user would like to see rule markings, such as row ruler markings and column ruler markings, on one or more sides of the LiquiMap. Row ruler markings refer to visual identifiers, positioned above or below a row of pixels of a LiquiMap, for demarcating portions of the LiquiMap that correspond to the rows of the original data set (or perhaps the aggregate data table in certain embodiments) upon which the LiquiMap is based. Column ruler markings refer to visual identifiers, positioned to the left or right of a column of a LiquiMap, for demarcating portions of the LiquiMap that correspond to the columns of the original data set (or perhaps in the aggregate data table in certain embodiments) upon which the LiquiMap is based. The purpose of row ruler markings and column ruler markings is to enable the viewer to quickly identify what portions of the data are represented by the LiquiMap. Row ruler markings may appear on the top of a LiquiMap, the bottom of a LiquiMap, or both the top and bottom of the LiquiMap. Similarly, column ruler markings may appear on the left side of a LiquiMap, the right side of a LiquiMap, or both the left side and right side of the LiquiMap.

Row and column ruler markings may be dynamically generated. For example, LiquiMap 370 of FIG. 3F has dynamically generated row and column ruler markings 372 according to an embodiment of the invention. The appearance and location of the row and column ruler markings on a LiquiMap may be dynamically determined by server application 112. According to one approach, whenever server application 112 creates a LiquiMap in step 240, software application 112 analyzes values in the one or more data sets selected in step 210 (or perhaps the aggregate data table created in step 220) to determine the appearance and location of the row and column ruler markers, and thereafter, when the LiquiMap is created, server application 112 updates the visual display of the LiquiMap to add the row and column ruler markers at the dynamically determined positions on the LiquiMap. For example, server application 112 may analyze aggregate data table 380 to determine that the column ruler markings of LiquiMap 370 should start with the value 1976 and identify the column names of aggregate data table 380 at a certain interval. A similar process will be performed to identify the row markings of LiquiMap 370 by analyzing the rows of aggregate data table 380.

Note that there are no limits on how many column ruler markings or how many row ruler markings may be used in a single LiquiMap. Multiple column ruler markings and multiple row ruler markings may be used on a single LiquiMap to identify different attributes of the data represented by the LiquiMap. For example, one column ruler marking may identify months and days, while another column ruler marking may identify weekends, while another column ruler marking may identify holidays.

In an embodiment, key columns may be used in the generation of ruler markings. Different values of data in key columns may be used in determining how to illustrate the demarcation of data shown by a ruler marking As a key column may be comprised of multiple columns of data that each have a different data type, a ruler marking may use different approaches for demarcating data of two or more data types. To illustrate one example, for a row ruler marking that illustrates time, a relatively longer tick mark may demarcate years, while relatively smaller tick marks may demarcate each hour in the day. Such an approach allows a user to see what data they are looking at in the LiquiMap at a glance. To illustrate another example, assume that key columns correspond to three columns that store department data, year data, and hour of day data. A ruler marking may be used for these key columns that adjusts the relative length of tick marks to demarcate data in different data types, e.g., a relatively longer tick mark may demarcate department data, a relatively average length tick mark may demarcate year data, and a relative shorter tick mark may demarcate hour of day data. In this way, using different relative lengths of tick marks in a ruler marking may demarcate data in any number of different data types. Other ways to demarcate data may be used by ruler marking by embodiments, e.g., in addition to or in place of changing the relative length of tick marks of a ruler marking, the color of a tick mark may be used to demarcate data of a certain data type.

Viewing the Data Values Represented by a Liquimap

Embodiments of the invention enable the data values represented by a LiquiMap to be displayed without incurring the cost of retrieving the data values from an external source. If a LiquiMap is created by server application 112 based on data obtained from data sets 160, 162, and 164, then client application 122 may be able to display the data values represented by pixels of the LiquiMap without retrieving those data values from server device 112 or by retrieving the data values from where data sets 160, 162, and 164 are stored. Client application 122 may be able to do this by deriving those data values using a special LiquiMap referred to as a Data Proxy.

As explained above, a Data Proxy is a type of LiquiMap that is created that exhibits certain characteristics. Thus, not every LiquiMap created by embodiments of the invention will be a Data Proxy; however; embodiments of the invention may be configured to create a Data Proxy for each data set on which one or more LiquiMaps are based. Thus, if four LiquiMaps are created using one data set, only one Data Proxy for the data set need be created by embodiments. A Data Proxy contains or maintains in association with the Data Proxy the minimum value and the maximum value of the values of the data set upon which the Data Proxy is based.

A Data Proxy may be used to derive the values of the data set upon which the Data Proxy is based. In an embodiment, client application 122 may be configured to know, or may otherwise be configured to calculate, (a) how many colors are supported by the digital image format of the Data Proxy, (b) how many bits of the image are used to represent each data value, and (c) the minimum value and maximum value of the data set or aggregate data table upon which the Data Proxy is based. This information may be, but need not be, recorded, stored, or encrypted in some format in the Data Proxy itself, e.g., the color values of certain pixels may be used to represent this information. Once this information is known, client application 122 may, for a particular color value for a pixel of a LiquiMap, derive the original data value in the data set for that pixel by (a) determining the corresponding pixel(s) in the Data Proxy, and (b) calculate the original data value based on the color value(s) of the corresponding pixel(s) in the Data Proxy, the minimum value, the maximum value, and the number of colors supported by the digital image format of the Data Proxy. Knowing the number of colors supported by the digital image format, the minimum value, and the maximum value enables client application 122 to determine the range of possible data values in the original data set. Once the color value(s) of the corresponding pixel(s) in the Data Proxy are identified, the color value(s) may be mapped by client application 122 to the corresponding data value.

Embodiments of the invention may maintain a Data Proxy to efficiently derive the values of any data set, such as an original data set (such as data sets 160, 162, and 164), an aggregate data table, and a post-analysis table. Thus, even if the user does not expressly request the creation of a Data Proxy for a particular data set or for a particular aggregate data table, embodiments may nevertheless create a Data Proxy to facilitate the display of data values associated with pixels of the LiquiMap. As image processing is fast and efficient, maintaining a Data Proxy allows embodiments to quickly obtain the original data values upon which a LiquiMap is based without retrieving those data values from their respective data sources.

In an embodiment, a user may issue a request to zoom in on (or enlarge) or zoom out of (or shrink) the display of a LiquiMap. If a display of a LiquiMap is enlarged past a configurable threshold, then the data values represented by the pixels of a LiquiMap may also be displayed in the LiquiMap in association with the pixels. For example, if the display of a LiquiMap is enlarged to the point where data values associated with pixels of a LiquiMap may be easily seen, then the appearance of the LiquiMap may be dynamically updated by client application 122 to display the data value represented by the color of each pixel as text. This text value may be surrounded by the color of its corresponding pixel. In this way, the user may zoom in on the display of the LiquiMap to view the actual data values represented by the appearance of the LiquiMap. In an embodiment, client application 122 may consult a Data Proxy in obtaining the original data values represented by the color value of each pixel.

In an embodiment, a user may move a mouse input device to move a mouse pointer over a portion of a LiquiMap, thereby selecting a particular pixel of the LiquiMap. In an embodiment, once a particular pixel of the LiquiMap is selected, the position of the particular pixel, as measured by the row ruler marking and/or the column ruler marking, may be shown on the display of client device 120. For example, LiquiMap 370 of FIG. 3F depicts a pixel that is selected by a mouse pointer. FIG. 3F shows that the position of the selected pixel, measured by the row ruler marking and the column ruler marking, is shown, e.g., the victim age is identified as 25 and the year is identified as 1988. Note that the values shown do not correspond to the data value associated with the pixel (for that value is represented by the color of the pixel).

In another embodiment, when a mouse pointer selects a particular pixel of the LiquiMap, the data values associated with that pixel, and possibly a configurable amount of neighboring pixels around the selected pixel, may also be shown on the display. To illustrate, consider FIG. 5, which is an illustration of a LiquiMap that depicts the data values in a 3 by 3 pixel grid 510 centered on a pixel that is identified by a mouse pointer according to an embodiment of the invention. Note that the size of pixel grid 510 is configurable, as the user could identify any size of pixel grid in the request of step 210. The data values in the pixel grid may be depicted nearby or in association with the pixel that is selected by the mouse pointer, or the data values in the pixel grid may be displayed at a fixed location, such as off to the side of the display of the LiquiMap. While this example involves a square grid of data values, other embodiments of the invention may display selected data values in other formations, e.g., an embodiment may depict a magnifying glass with a circular lens, and a user may position the circular lens of the magnifying glass over portions of the LiquiMap to cause data values associated with selected portions of the LiquiMap to be displayed.

Figure 5:
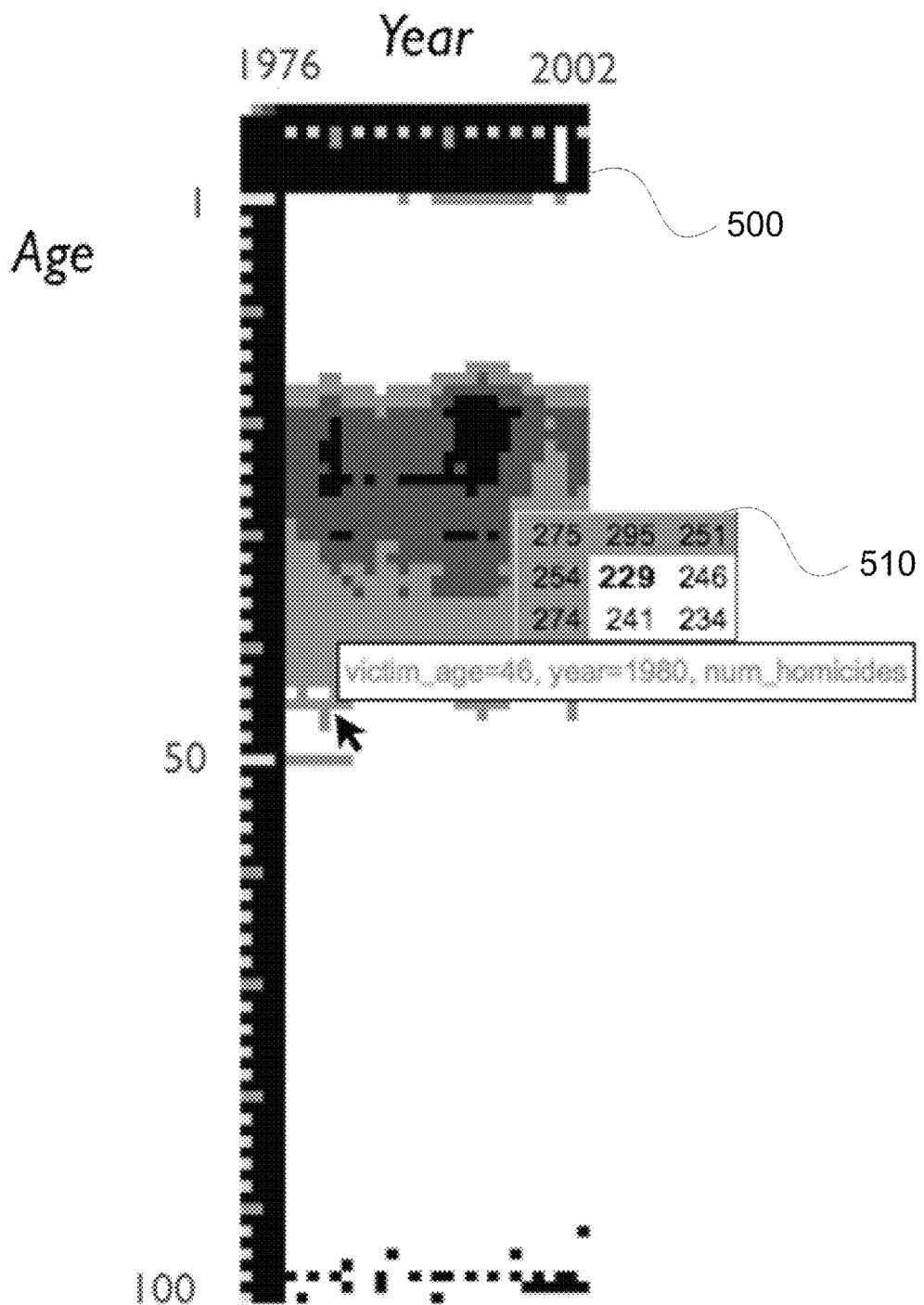
FIG. 5 is an illustration of a LiquiMap that depicts a plurality of data values identified by a mouse pointer according to an embodiment of the invention.

Pixel grid 510 of FIG. 5 may, but need not, depict the background color of each cell in the same color as the corresponding pixel in LiquiMap 500. For example, the data value "275" in pixel grid 510 is depicted in a cell having a grey background because the corresponding pixel of LiquiMap 500 also is depicted in a grey background. As another example, the data value "229" in pixel grid 510 is depicted in a cell having a white background because the corresponding pixel of LiquiMap 500 also is depicted in a white background.

Any manner or approach for selecting one or more pixels of a LiquiMap may be used by embodiments of the invention, as embodiments may use a plethora of different approaches for selecting pixels or portions of a LiquiMap. Non-limiting, illustrative approaches for selecting pixels of a LiquiMap include positioning a mouse pointer over a pixel of a LiquiMap, selecting a region of a LiquiMap having a certain color, selecting a region of a LiquiMap associated with a bounded area (e.g., the bounded area may be determined using a mouse by clicking a button and dragging the mouse to adjust the size and position of the bounded area), and selection a region associated with a portion of a ruler marking.

Formulas Applied to Any Data Set

In an embodiment, server application 112 may enable a user to select from a variety of different formulas to apply against a data set. Additionally, server application 112 may enable a user to define and store any number of custom formulas which may be applied against a data set.

Once a formula has been defined, the formula may be applied against any aggregate data table. For example, the same formula may be applied against three different aggregate data tables comprising data for each of data set 160, data set 162, and data set 164. Formulas may access any value stored in an aggregate data tables, which may include computed values such as mean, median, total, etc.

While a data set may contain data about any number of real-world occurrences, it is, after all, just numbers, and so any formula that is defined that is designed to operate on one aggregate data table may be used on any number of other aggregate data tables in system 100. However, embodiments may support the definition of formulas that are specifically tailored or designed to work with a particular data set or a particular type of data set.

In an embodiment, in response to receiving input, such as a mouse click, that selects a portion of a LiquiMap (such as a portion depicted in the same color or a bounded area identified using an input device), software application 112 may analyze the data stored within the cells of the aggregate data table that corresponds to the selected portion of the LiquiMap, and thereafter, software application 112 may update the display of the LiquiMap to reflect the performance of the data analysis on the data stored within the cells of the aggregate data table that corresponds to the selected portion of the LiquiMap. Note that a user could select any portion of a LiquiMap in this manner. For example, the user could pick one row or ten rows or a portion corresponding to a single color or multiple colors. This feature of embodiments is useful in that it allows the selected regions of the LiquiMap to be the subject of further analysis "on the fly." The visual appearance of the LiquiMap may be dynamically updated to reflect further analysis.

To illustrate an example, if a user displays a LiquiMap that depicts pixels in the color red if they represent above average values and in the color green if the pixels represent below average values, then by clicking on the red portion of the LiquiMap, the user may instruct server application 112 to update the appearance of the LiquiMap by performing further analysis on just the selected portion of data, i.e., the data represented by the red pixels in the LiquiMap. In this way, the user may update the appearance of the LiquiMap such that the pixels that were formerly red will be changed to yellow (as an example) if the data represented by the pixels is below the average value of the data values in the red portion, but will remain red if the data represented by the pixels is above the average value of the data values in the red portion. Note that no analysis was performed on the data represented by the pixels shown in green.

While a wide variety of different formulas may be used by embodiments of the invention, to illustrate certain concrete examples, in an embodiment, an aggregate average formula may be used. This formula determines whether the current value of a cell is less than, equal to, or greater than the average value of the entire data set or a portion thereof, such as one or more rows or columns. Thus, the application of this formula results in one of three possible states (less than, equal to, or greater than the aggregate average), and these three states may be mapped to any three colors (for example, green, yellow, and red respectively).

Another illustrative example of a formula that may be used is an N standard deviation formula. The value of N may correspond to an integer and may be defined at runtime. This formula colors each standard deviation away from the average a different color. Thus, a cursory visual examination of the LiquiMap will enable one to quickly identify what standard deviation portions of the data fall into.

Other examples of formulas that may be used are a minimum/maximum formula (the application of which results in states that indicate whether a data point is a minimum or maximum of the data set) and a chi squared formula (the application of which results in states that indicate whether the value of a data point is less than, equal to, or greater than the sum of a row total and a column total divided by the total of the data set).

Real-Time Updates

Each LiquiMap may be created using data from one or more data sources that may each be consumed all at once (such as the result set from an executed database query) or incrementally updated in real time (such as when a selected data source is a real-time data feed). In the case when a selected data set is a real-time data feed, only the portion of the LiquiMap that corresponds to cells of the aggregate data table that have changed need be updated. In this way, when a LiquiMap represents a real-time data feed, the entire LiquiMap need not be recreated, thereby saving processing resources.

Using Images as Data Sets

In an embodiment, any digital image may act as a data set. After all, the color of the pixels of a digital image may be associated with or correspond to a number. Thus, the colors of the pixels of a digital image may represent a data set. The color associated with a pixel may be expressed as a number, and so colors can be easily converted into numbers, and vice-versa. In this way, a LiquiMap (which may or may not be a Data Proxy), as well as any other digital image, may be used as a selected data set in system 100. For example, data set 164 in system 100 may be an image, such as a previously generated LiquiMap.

Combining Liquimaps to Perform Further Analysis

Since embodiments of the invention may treat previously generated LiquiMaps as a data set, operations may be performed on LiquiMaps as if the LiquiMaps were data sets. A user may instruct server application 112 to select two or more LiquiMaps, and thereafter, server application 112 may generate a new LiquiMap whose appearance is based on the data represented by the two or more selected LiquiMaps. In this way, the newly created LiquiMap may have an appearance that reflects the performance of all the formulas applied to the data depicted by each of the two or more selected LiquiMaps.

For example, assume two LiquiMaps, each having pixels of only two colors (red and green), are to be combined. Each of the colors of the pixels may be mapped to a number, e.g., red may be mapped to 1 and green may be mapped to 2. An aggregate data table based on these two LiquiMaps will have cells that have two values, one value for each of the two LiquiMaps. Once this aggregate data table is created, any number of formulas may be applied to the aggregate data table generate a new LiquiMap. While only two LiquiMaps are used in this example, those in the art shall appreciate that any number of images may be combined in this fashion.

Figure 6B:
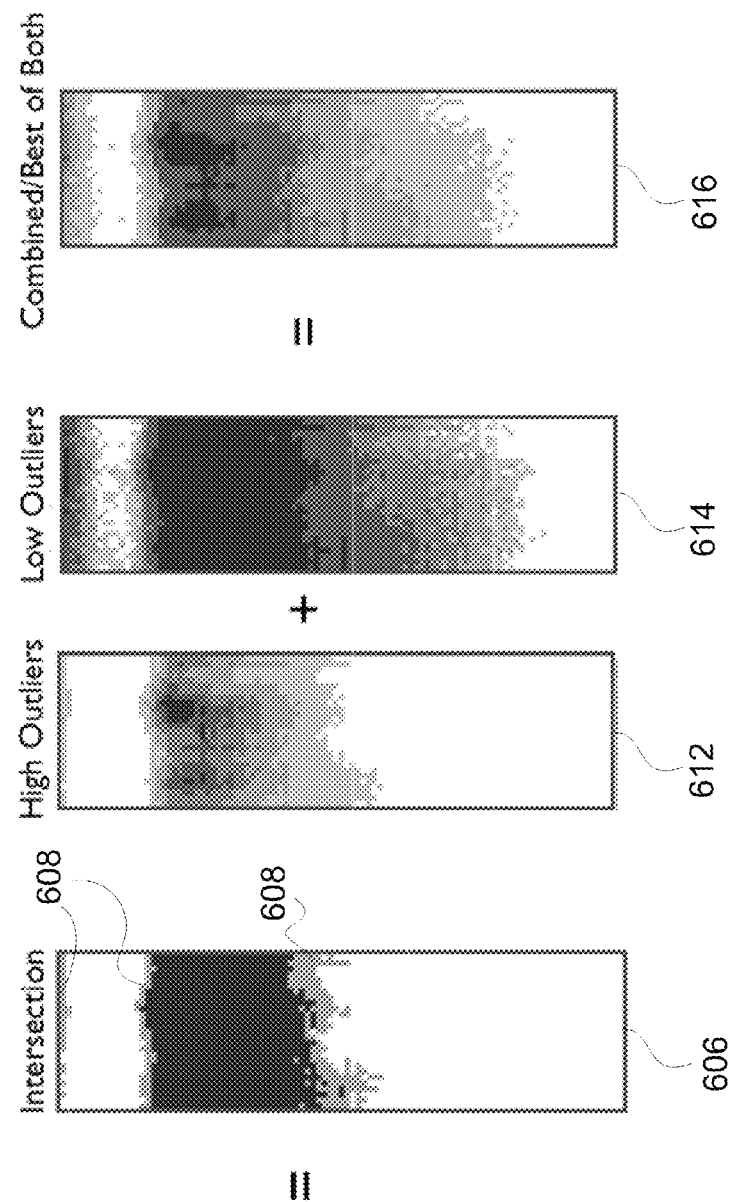
FIG. 6B is a second illustration of merging two LiquiMaps according to an embodiment of the invention.
Figure 6A:
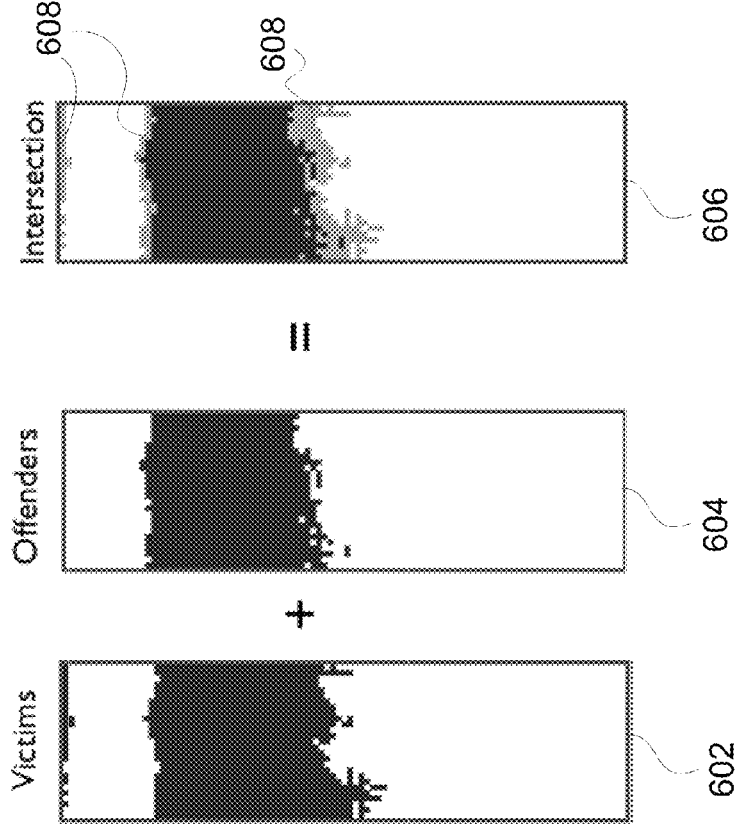
FIG. 6A is a first illustration of merging two LiquiMaps according to an embodiment of the invention.

To illustrate another example, consider FIG. 6A, which is an illustration of merging two LiquiMaps according to an embodiment of the invention. If LiquiMap 602 and LiquiMap 604 are selected as data sets in step 210 of FIG. 2, then LiquiMap 606 may be created by an embodiment. Area 608 of LiquiMap 606 identifies the area in which LiquiMap 602 and LiquiMap 604 do not overlap, thereby quickly enabling a view to identify potential areas of interest in the data set represented by LiquiMap 606.

Another example of using LiquiMaps as a data set is depicted in FIG. 6B. In the example of FIG. 6B, conducting a first type of data analysis on a particular aggregate data table produces LiquiMap 612. The type of data analysis performed in the creation of LiquiMap 612 produced an appearance of LiquiMap 612 that easily distinguished between portions of data in a certain range of relatively high values, but did not do as well in distinguishing portions of data in a range of relatively lower values. On the other hand, conducting a second type of data analysis on the same aggregate data table results in LiquiMap 612 that easily distinguished between portions of data in a certain range of relatively low values, but did not do as well in distinguishing portions of data in a range of relatively higher values. Embodiments of the invention enable both LiquiMap 612 and 614 to be selected as a data set, and these selected data sets may be combined in a manner that produces LiquiMap 616, which has an appearance that allows one to easily distinguish between portions of data in both the high and low ranges.

Portions of multiple LiquiMaps may be merged into a single LiquiMap by embodiments of the invention. For example, a 5 pixel by 5 pixel LiquiMap may be created using the color of a single pixel of 25 different LiquiMaps. In this way, one can easily view characteristics of a data point of many different data sets. For example, one would easily be able to distinguish a few red pixels (corresponding to data points having a characteristic of concern) in the 5×5 LiquiMap if the remaining pixels were green (corresponding to data points having a characteristic in a normal range). Of course, the 5×5 grid in this example is merely illustrative of one embodiment, as embodiments may lay out all 25 pixels in a single row, a single column, or in another shape of any size. Further, portions of any size (from one pixel to the entire LiquiMap) of a LiquiMap may be used in merging LiquiMaps together in this fashion.

Animating a Liquimap

As explained above, step 220 may be implemented using a plethora of different types of data analysis. In an embodiment, the data analysis of step 220 may include the application of a formula against the data stored in aggregate data table 310, where the formula includes one or more variables. The user may specify that the same formula should be applied against the same aggregate data table using a plurality of different values in one or more variables. For example, if a particular variable in a formula corresponds to a percentage, then the user may specify that the same formula should be applied twenty times against the same aggregate data table using increasing increments of 5% in that variable. In this way, server application 112 can simultaneously create twenty different LiquiMaps that each represents increasing increments of 5% for that variable.

In an embodiment, each of the LiquiMaps created in this manner may be displayed, one at a time, in a sequence that corresponds to a progression of values of the variables of the formula used to generate each of the plurality of digital images. As the display of LiquiMaps in this manner is akin to watching a movie, LiquiMaps displayed in this manner are said to be animated LiquiMaps.

Figure 7:
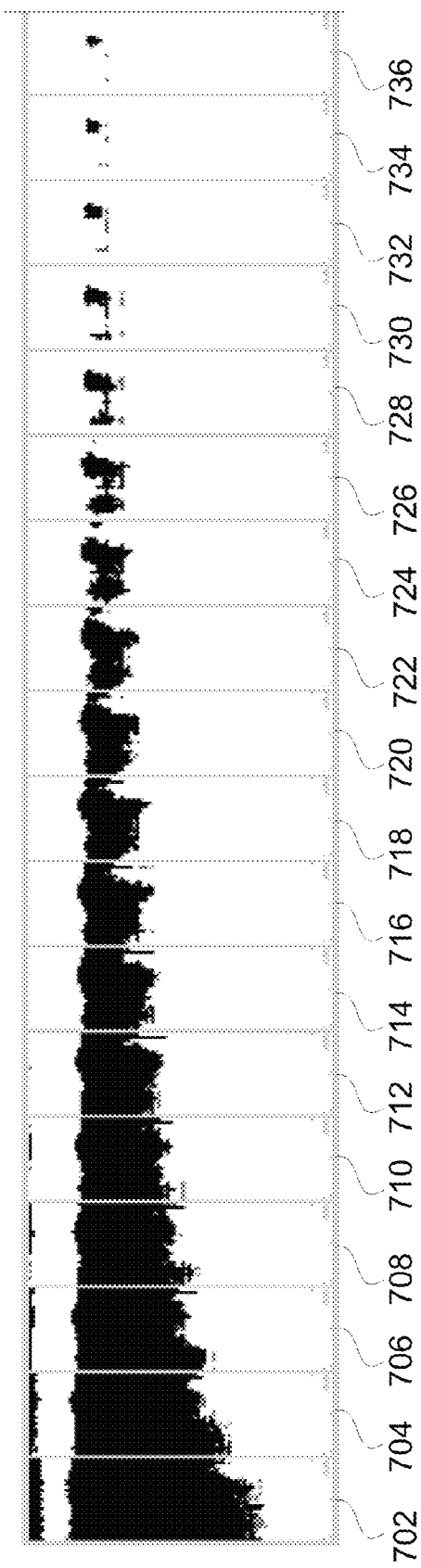
FIG. 7 is an illustration of the changing appearance of an animated LiquiMap according to an embodiment of the invention.

To illustrate, consider FIG. 7, which is an illustration of the changing appearance of an animated LiquiMap according to an embodiment of the invention. In this example of FIG. 7, each LiquiMap in the sequence of LiquiMaps 702-736 is generated based on the same aggregate data table, but using different variables in an applied formula. In an embodiment, all of the LiquiMaps 702-736 depicted in FIG. 7 may be displayed on a user interface, thereby allows the user to easily understand the progression of trends within the data. In another embodiment, each of the LiquiMaps depicted in FIG. 7 may be shown, one at a time, in sequence, on a user interface, thereby allowing each of the LiquiMaps to be viewed in a smaller user interface. Such an embodiment may be helpful, for example, in viewing the LiquiMaps of FIG. 7 on a portable device, which typically have smaller viewing screens. Advantageously, by displaying an animated LiquiMap, a viewer is able to readily appreciate the change in different values of a particular variable of the formula to quickly identify patterns in the data.

In other embodiments, a sequence of LiquiMaps may be displayed simultaneously in a side by side fashion, rather than being displayed one at a time. For example, each of LiquiMaps 702-736 may be shown, in sequence, on a display. By viewing a sequence of LiquiMaps in this fashion, it may be easier for the viewer to appreciate trends or patterns in the data, since the trends and patterns in the data are easily discernable.

Histograms

In an embodiment, LiquiMaps may be used to detect patterns in data by enabling a user to dynamically generate a histogram. Server application 112 may, in response to instruction from a user, update the appearance of a LiquiMap to depict the colors of the pixels of the LiquiMap as a histogram. A histogram is a graphical display of the frequencies of types of data, typically shown using a bar. Server application 112 may update the appearance of a LiquiMap such that the colors of the pixels of the LiquiMap are grouped together by row or by column (depending upon the instruction of the user). In this way, a histogram may be dynamically generated using the colors of the pixels to enable a viewer to quickly ascertain which values of data are more frequent than others.

Figure 10:
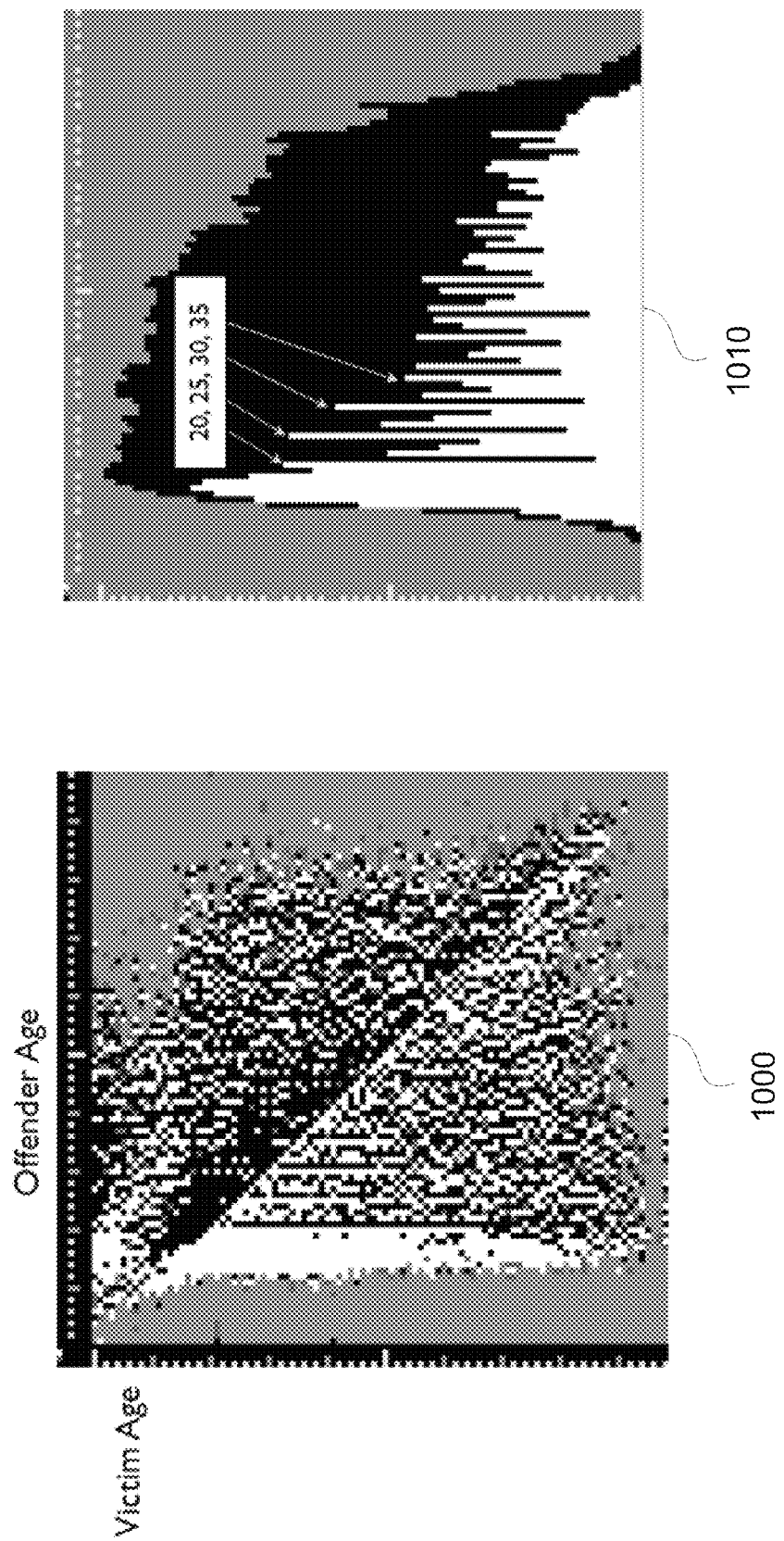
FIG. 10 is an illustration of a histogram created by an embodiment of the invention.

FIG. 10 is an illustration of a histogram 1010 created by an embodiment of the invention. An embodiment may dynamically generate histogram 1010, which in this example is based upon the data depicted in LiquiMap 1000. LiquiMap 1000 depicts data regarding the age of homicide victims versus the age of the offender. Note that different trends in the data may be more easily seen in histogram 1010 than in LiquiMap 1000. For example, while this trend would be more easily discernable if LiquiMap 1000 was rendered in color, one can see from looking at LiquiMap 1000 that there is a diagonal line that runs from the northwest to the southeast in the appearance of LiquiMap 1000. This diagonal line indicates that a person is more likely to commit a homicide against someone of their own age.

In examining histogram 1010, one can see that there appears to be a spike, or a relative increase, in the amount of homicides offenders of people having an age of 20, 25, 30, and 35. This pattern is not as easily seen by looking at LiquiMap 1000. After researching why there is a relative increase in the amount of homicides offenders of people having an age of 20, 25, 30, and 35, it was discovered that the pattern could be explained due to how the original data set was collected. Homicide officers would round the age of the homicide offender to the nearest increment of five years if the age of the homicide offender was not known. This information is helpful is analyzing how to interpret and value the data in the data set. Such insight may not be so easily obtainable by simply reviewing the raw data in the original data set; fortunately, embodiments provide a variety of different ways of graphically depicting trends and patterns of a data set.

Additional Examples of Use

FIG. 8A displays LiquiMaps 810 and 812 according to an embodiment of the invention. LiquiMaps 810 and 812 depict data from a standardized test that was given in a public school. In this example, a teacher's compensation was based in part on the amount of correct answers their students gave on the test. The questions of the test were ordered in increasing level of difficulty, and so questions later in the test were more difficult than questions earlier in the test. The columns of LiquiMaps 810 and 812 correspond to a set of 45 questions on the test that was given to a classroom of students, while the rows of LiquiMaps 810 and 812 correspond to a number of students in a classroom. If a question was answered correctly by a student, the corresponding pixel in LiquiMaps 810 and 812 is depicted in green; otherwise, the pixel is depicted in red.

LiquiMaps 810 and 812 depict the results of different classrooms. While only two classrooms are depicted, embodiments may be used to show a LiquiMap for any number of classrooms. It is interesting to note that LiquiMap 810 seems to depict anomalous behavior in area 820. Area 820 of LiquiMap 810 has a surprisingly regular pattern of correct answers that differs from the pattern of answers in the remainder of LiquiMap 810 as well as the entirety of LiquiMap 812. Thus, by a quick glance at LiquiMaps 810 and 812, one may develop a strong suspicion that the teacher of classroom A may have altered the answers of his or her students on the standardized test in questions in area 820 to obtain a greater compensation.

As another example, consider FIG. 8B, which is an illustration 830 of a portable device that displays eight different LiquiMaps (LiquiMaps 850-866) that each show the movement of a different person within a building according to an embodiment of the invention. In the example of FIG. 8B, a plurality of people were equipped with radio-frequency identification (RFID) tags, which allowed computerized systems to monitor their location within a building. The computerized systems also recorded the dimensions of the building. This data is depicted in LiquiMaps 850-866. Walls and other areas otherwise not traversable are depicted in black, while areas in which a person may walk are depicted in white. The movement of a person over time may be depicted using color. For example, locations where a person was more recently located may be depicted in a stronger or different color than locations where a person was less recently. In this way, the movement of a large number of people may be analyzed by embodiments of the invention. Indeed, all maps and other geographical data may be processed by embodiments of the invention in a similar fashion, as locations on a map may be identified using two key columns.

Another illustrative embodiment is depicted by FIG. 11A, which is a LiquiMap 1100 that depicts the number of web site page hits for each hour of the day over a multiple-year period. As shown by scale 1102, the darker the color of a pixel of LiquiMap 1100, the greater the number of hits. Scale 1102 illustrates that pixels associated with an hour having a page hit total within the top 25% of page hits for any hour are depicted in black, pixels associated with an hour having a page hit total in the next 25% of page hits for any hour are depicted in dark grey, and so on. Column ruler marking 1110 illustrates how columns of pixels of LiquiMap 1100 correspond to months of the day as shown by the labeled months. Additionally, column ruler marking 1110 depicts each day of a month using tick marks, e.g., each day of each month is associated with a column of pixels that is identified by a corresponding tick mark for that day of the month. Row ruler marking 1120 illustrates how certain rows of LiquiMap 1100 correspond to certain years. Additionally, each year shown by the row ruler marking is associated with tick marks that correspond to an hour of the day. Thus, each row of pixels of LiquiMap 1100 corresponds to a particular hour (for example, noon to 1 PM) for a particular year, while each column of pixels of LiquiMap 1100 corresponds to a particular day (for example, September 4) of the year.

LiquiMap 1100 illustrates how embodiments of the invention may be used to quickly ascertain patterns and trends of a large data set. If one were to look at the raw data for page hits of a web site for each hour for over a three year period, it would be difficult to have any sense of any patterns or trends simply by looking at the large amount of numerical values. However, by a quick visual inspection of LiquiMap 1100, one can easily see such patterns and trends in the data, even though LiquiMap 1100 represents more than 3 billion different page hits on the web site. For example, there is an uncharacteristic period of inactivity in location 1130 for years 2006 and 2007. While this inactivity appears odds, using column ruler marking 1110, one may discover that such period of inactivity should be expected since there is no February 29 in the years 2006 and 2007, as these years are not leap years.

Looking at LiquiMap 1100, one may quickly learn about the user base of the web site. For example, the regular patterns of black suggest that the majority of people visit the web site during the day and Monday through Friday. The band of white indicates that people do not visit the web site as much in the nighttime hours. Many other types of meaningful observations may be quickly made about the web site, e.g., the large concentration of black for the months of September and October in 2006 indicate that something was going on during that time period that drove users to the web site, while it appears that user interest in the web site tends to decrease over the summer.

Figure 11B:
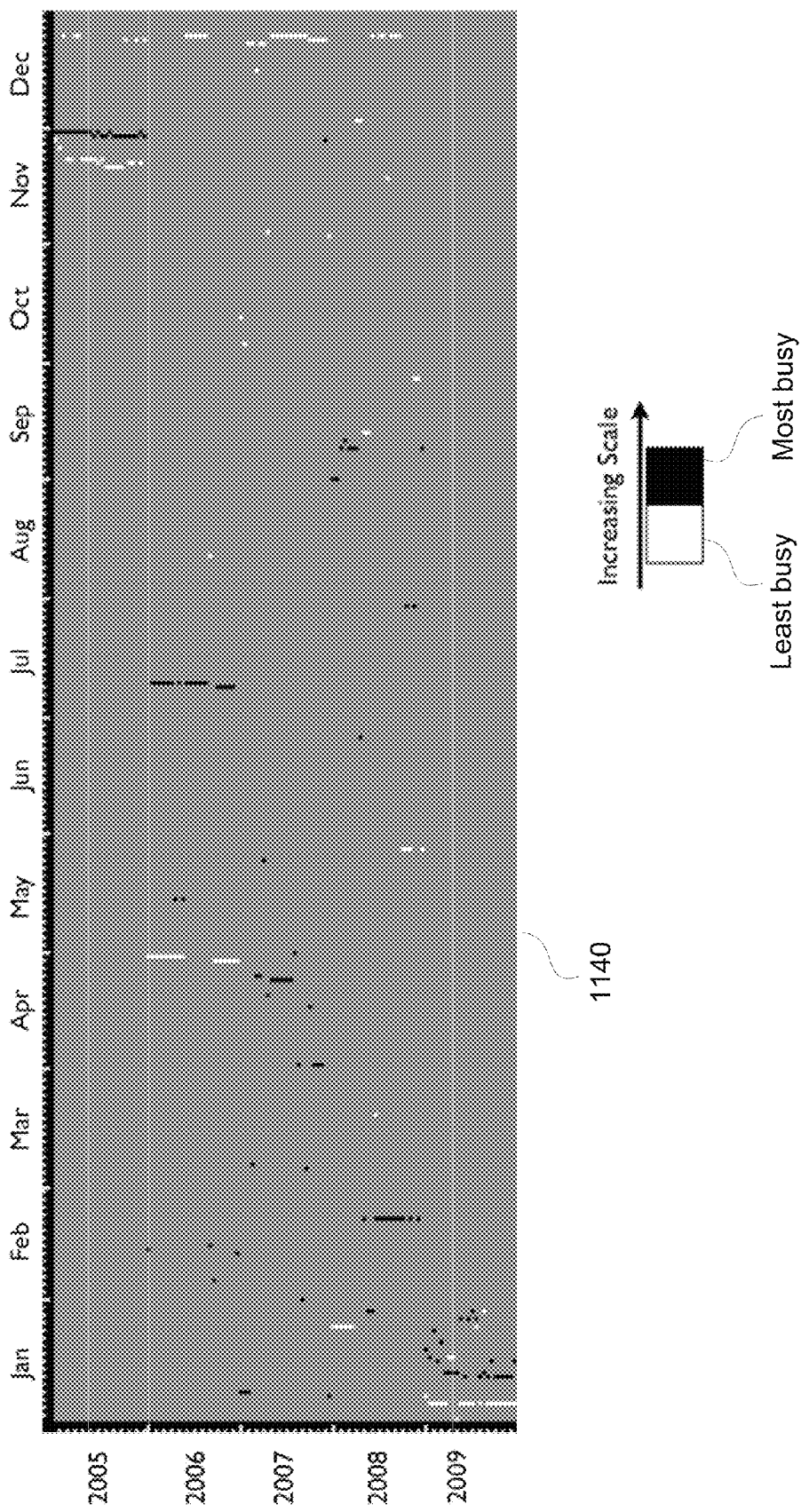
FIG. 11B is a LiquiMap that depicts, for each hour of the day, the busiest and least busy day of the year for more than three years worth of web site page hits according to an embodiment of the invention.

Various formulas may be used by embodiments to generate LiquiMaps that provide additional insight into patterns in the data. To illustrate, consider FIG. 11B, which is an illustration of LiquiMap 1140 that depicts, for each hour of the day, the busiest and least busy day of the year for more than three years worth of data for a web site. As another example, FIG. 11C is an illustration of LiquiMap 1150 that depicts, for each calendar day, the busiest and least busy hour across all years for more than three years worth of data for a web site. LiquiMaps 1140 and 1150 may each be created using a different formula in step 220 of FIG. 2. Thus, a formula may be created to generate a LiquiMap based on how you want to analyze a data set. If one is interesting in determining the busiest hour of the day, then LiquiMap 1150 may be helpful, whereas LiquiMap 1140 may be more helpful in determining what day of the year experiences the most traffic on the web site.

The above examples are not meant to depict or characterize all ways in which embodiments of the invention may be employed, but rather, is meant to illustrate certain non-limiting concrete examples of particular implementations. Note that the data sets discussed above are merely illustrative, as embodiments of the invention may be used to analyze any type of data set irrespective of what the data actually represents in the real world.

While the drawings depicted in the present application are rendered in grayscale, embodiments of the invention typically depict LiquiMaps using a variety of different colors or other attributes (such as temperature, sound, or texture), as explained above.

Implementing Mechanisms

In an embodiment, one or more of server 110, client 120, and device 190 may be implemented on or using a computer system. FIG. 9 is a block diagram that illustrates a computer system 900 upon which an embodiment of the invention may be implemented. In an embodiment, computer system 900 includes processor 904, main memory 906, ROM 908, storage device 910, and communication interface 918. Computer system 900 includes at least one processor 904 for processing information. Computer system 900 also includes a main memory 906, such as a random access memory (RAM) or other dynamic storage device, for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device for storing static information and instructions for processor 904. A storage device 910, such as a magnetic disk or optical disk, is provided for storing information and instructions.

Computer system 900 may be coupled to a display 912, such as a cathode ray tube (CRT), a LCD monitor, and a television set, for displaying information to a user. An input device 914, including alphanumeric and other keys, is coupled to computer system 900 for communicating information and command selections to processor 904. Other non-limiting, illustrative examples of input device 914 include a mouse, a trackball, or cursor direction keys for communicating direction information and command selections to processor 904 and for controlling cursor movement on display 912.

While only one input device 914 is depicted in FIG. 9, embodiments of the invention may include any number of input devices 914 coupled to computer system 900.

Embodiments of the invention are related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 904 for execution. For example, the instructions may initially be carried on a magnetic disk of a remote computer. The remote computer can load the instructions into its dynamic memory and send the instructions over a network link 920 to computer system 900.

Communication interface 918 provides a two-way data communication coupling to a network link 920 that is connected to a local network. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through a local network to a host computer or to data equipment operated by an Internet Service Provider (ISP).

Computer system 900 can send messages and receive data, including program code, through the network(s), network link 920 and communication interface 918. For example, a server might transmit a requested code for an application program through the Internet, a local ISP, a local network, subsequently to communication interface 918. The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, only limitations, elements, properties, features, advantages, or attributes that are expressly recited in a claim should limit the scope of such claim. The specification and drawings are, accordingly, to be regarded in an illustrative rather than a restrictive sense.

What is claimed is:

1. A machine-implemented method for generating a digital image that facilitates data analysis, comprising:
   upon receiving selection data that identifies one or more data sets and one or more columns of the one or more data sets, arranging values of the one or more data sets into an aggregate data table based on the selected one or more columns, wherein each cell of the aggregate data table comprises a set of values from the one or more data sets;
   applying one or more formulas to each cell of the aggregate data table to generate a post-analysis table, wherein each cell of the post-analysis table comprises a single value;
   mapping, for each cell of the post-analysis table, the value stored therein to a particular color;
   generating the digital image based on the mapping of values in each of the cells of the post-analysis table to color, wherein the digital image identifies the minimum value and the maximum value of the one or more data sets; and
   performing an analytical operation on the digital image by deriving values represented by the colors associated with the pixels of the digital image using the minimum value and the maximum value, wherein the analytical operation is performed without retrieving data from the one or more data sets.

2. The machine-implemented method of claim 1, wherein mapping comprises mapping a range of possible values between the minimum value and the maximum value to a set of colors supported by a particular digital image format.

3. The machine-implemented method of claim 1, wherein generating the digital image further comprises:
   in response to receiving a set of updated values from the one or more data sets, updating the appearance of a first portion of the digital image without updating the appearance of a second portion of the digital image, wherein the first portion of the digital image corresponds to pixels representing the set of updated values.

4. The machine-implemented method of claim 1, wherein generating the digital image further comprises:
   a software application dynamically determining the appearance and location of one or more visual identifiers for demarcating portions of the digital image that correspond to rows and columns of the one or more data sets; and
   the software application generating the digital image with the determined one or more visual identifiers.

5. The machine-implemented method of claim 1, further comprising:
   in response to receiving input that selects a portion of the digital image, (a) the software application applying a formula on the data corresponding to the selected portion of the digital image, and (b) the software application updating the display of the digital image to reflect the performance of the formula on the data represented by the selected portion of the digital image.

6. The machine-implemented method of claim 1, wherein the digital image is a first digital image of a plurality of digital images that are each generated using the data in the aggregate data table, and wherein the plurality of digital images are depicted on a display of a single portable device.

7. The machine-implemented method of claim 1, further comprising:
in response to receiving input that selects a plurality of digital images which each represent a data set, generating a merged digital image that has an appearance derived from a result of a second analytical operation performed against the data sets represented by the plurality of digital images, wherein the second analytical operation is performed using the plurality of digital images.

8. The machine-implemented method of claim 1, further comprising:
in response to receiving input that requests the display of the digital image to be enlarged, adjusting the display of the digital image such that the depiction of two or more pixels of the digital image is based upon a single value in the one or more data sets; and
in response to receiving input that requests the display of the digital image to be reduced, adjusting the display of the digital image such that the depiction of one pixel of the digital image is based upon two or more values in the one or more data sets.

9. The machine-implemented method of claim 1, further comprising:
in response to receiving input that requests the display of the digital image to be enlarged, (a) enlarging the display of the digital image, and (b) changing the appearance of the digital image to depict numerical values of the one or more data sets that are represented by the colors of the pixels of the digital image.

10. The machine-implemented method of claim 1, further comprising:
in response to receiving input that selects a pixel of the digital image, a software application depicting a numerical value in the one or more data sets that is associated with the selected pixel.

11. The machine-implemented method of claim 10, wherein in response to receiving the input, the software application additionally depicts numerical values in the one or more data sets that are associated with pixels of the digital image that are within a configurable proximity to the pixel.

12. The machine-implemented method of claim 1, further comprising:
a software application generating a plurality of digital images, wherein the appearance of each of the plurality of digital images depicts a result of applying a different set of values for variables of a formula to the one or more data sets or the digital image; and
the software application causing each of the plurality of digital images to be visually displayed in a sequence that corresponds to the values of the variables of the formula used to generate each of the plurality of digital images.

13. The machine-implemented method of claim 1, wherein a software application resides at a server, and wherein the method further comprises:
sending, to a client, the digital image, wherein the client is configured to display the digital image to a user, and wherein the client is configured to perform the analytical operation on the digital image.

14. The machine-implemented method of claim 1, further comprising:
updating the appearance of the digital image to depict a histogram using the colors of the pixels of the digital image.

15. The machine-implemented method of claim 1, wherein the steps of arranging values, applying one or more formulas, mapping, and generating the digital image are performed by one or more software applications.

16. The machine-implemented method of claim 1, wherein mapping further includes mapping the value to a sound, texture, or a temperature.

17. The machine-implemented method of claim 1, wherein, without changing the display resolution of the digital image, the color of two or more pixels in the digital image represents a single numerical value within the one or more data sets.

18. The machine-implemented method of claim 1, wherein the digital image identifies the minimum value and the maximum value of the one or more data sets using colors of one or more pixels of the digital image.

19. At non-transitory machine-readable storage medium storing one or more sequences of instructions, which when executed by one or more processors, cause:
upon receiving selection data that identifies one or more data sets and one or more columns of the one or more data sets, arranging values of the one or more data sets into an aggregate data table based on the selected one or more columns, wherein each cell of the aggregate data table comprises a set of values from the one or more data sets;
applying one or more formulas to each cell of the aggregate data table to generate a post-analysis table, wherein each cell of the post-analysis table comprises a single value;
mapping, for each cell of the post-analysis table, the value stored therein to a particular color;
generating the digital image based on the mapping of values in each of the cells of the post-analysis table to color, wherein the digital image identifies the minimum value and the maximum value of the one or more data sets; and
performing an analytical operation on the digital image by deriving values represented by the colors associated with the pixels of the digital image using the minimum value and the maximum value, wherein the analytical operation is performed without retrieving data from the one or more data sets.

20. A device, comprising:
one or more processors; and
a machine-readable storage medium storing one or more sequences of instructions, which when executed by the one or more processors, cause:
upon receiving selection data that identifies one or more data sets and one or more columns of the one or more data sets, arranging values of the one or more data sets into an aggregate data table based on the selected one or more columns, wherein each cell of the aggregate data table comprises a set of values from the one or more data sets;
applying one or more formulas to each cell of the aggregate data table to generate a post-analysis table, wherein each cell of the post-analysis table comprises a single value;
mapping, for each cell of the post-analysis table, the value stored therein to a particular color;
generating the digital image based on the mapping of values in each of the cells of the post-analysis table to color, wherein the digital image identifies the minimum value and the maximum value of the one or more data sets; and performing an analytical operation on the digital image by deriving values represented by the colors associated with the pixels of the digital image using the minimum value and the maximum value, wherein the analytical operation is performed without retrieving data from the one or more data sets.

\* \* \* \* \*